United States Patent
Hatano

(10) Patent No.: US 8,224,041 B2
(45) Date of Patent: Jul. 17, 2012

(54) MEDIA DATA PROCESSING APPARATUS AND MEDIA DATA PROCESSING METHOD

(75) Inventor: Kouji Hatano, Tokyo (JP)

(73) Assignee: Panasonic Corporation, Osaka (JP)

( * ) Notice: Subject to any disclaimer, the term of this patent is extended or adjusted under 35 U.S.C. 154(b) by 836 days.

(21) Appl. No.: 12/374,254

(22) PCT Filed: Jul. 19, 2006

(86) PCT No.: PCT/JP2006/314296
§ 371 (c)(1),
(2), (4) Date: Jan. 16, 2009

(87) PCT Pub. No.: WO2008/010275
PCT Pub. Date: Jan. 24, 2008

(65) Prior Publication Data
US 2009/0310819 A1 Dec. 17, 2009

(51) Int. Cl.
*G06K 9/00* (2006.01)
(52) U.S. Cl. ... 382/118; 382/100; 382/195; 348/211.99; 348/25.042
(58) Field of Classification Search .................. 382/118, 382/100, 195; 348/211.9, E5.042
See application file for complete search history.

(56) References Cited

U.S. PATENT DOCUMENTS

| 2006/0028558 A1 | 2/2006 | Sato et al. |
| 2006/0123241 A1 | 6/2006 | Martinian et al. |

FOREIGN PATENT DOCUMENTS

| JP | 2000056681 A | 2/2000 |
| JP | 2000358025 A | 12/2000 |
| JP | 2001211161 A | 8/2001 |
| JP | 2002-305704 A | 10/2002 |
| JP | 2004054672 A | 2/2004 |
| JP | 2004-126712 A | 4/2004 |
| JP | 2005229265 A | 8/2005 |
| JP | 2005267146 A | 9/2005 |
| WO | 2006006081 A2 | 1/2006 |

OTHER PUBLICATIONS

International Search Report, dated Dec. 21, 2010, for PCT/JP2006314296, 12 pages.

*Primary Examiner* — Matthew Bella
*Assistant Examiner* — Ruiping Li
(74) *Attorney, Agent, or Firm* — Seed IP Law Group PLLC

(57) ABSTRACT

In the case that media data containing image information of persons are managed, protection of privacy is realized, and an increase in management costs and a deterioration of operability are suppressed.

In a media data processing apparatus into which media data containing at least one image information is inputted so as to produce encrypted media data, the media data processing apparatus is equipped with: biological feature extracting unit 10 for extracting a feature of biological information which is related to at least one person contained in said image information from the media data inputted thereinto; and encrypting process unit 20 for partially, or wholly encrypting the media data based upon the feature extracted by the biological feature extracting unit. A feature parameter of a face of the person contained in the media data is utilized.

11 Claims, 22 Drawing Sheets

FEATURED POINT INFORMATION (UPPER LEFT PORTION OF EACH AREA IS ORIGIN)

| | X1 | Y1 |
|---|---|---|
| F1 | 60 | 161 |
| F2 | 130 | 167 |
| F3 | 69 | 184 |
| F4 | 124 | 193 |
| F5 | 151 | 270 |

→

RATIO "α" OF DISTANCE (F1 TO F2) TO DISTANCE (F3 TO F2)
$=sqrt((130-60)^2+(167-161)^2)/sqrt((124-69)^2+(193-184)^2)$
$=1.26$ RATIO "β" OF DISTANCE (F2 TO F5) TO DISTANCE (F4 TO F5)
$=sqrt((124-151)^2+(193-270)^2)/sqrt((151-124)^2+(270-193)^2)$
$=1.29$

→

BIOLOGICAL FEATURE
$P1=(1.26, 1.29)$

FIG. 8

SUCH A RETRIEVED RESULT HAVING THE SHORTEST DISTANCE IS
ASSUMED AS A RETRIEVED RESULT AMONG BIOLOGICAL FEATURE IN
WHICH DISTANCES FROM "P1 = (1.26, 1.29)" ARE SMALLER THAN A
PREDETERMINED VALUE (FOR EXAMPLE, 0.02)

| NAME | MAIL ADDRESS | BIOLOGICAL FEATURE | PUBLIC KEY (Kpi): 1024 BITS |
|---|---|---|---|
| A | AAA@AAA.AAA | ... | ... |
| B | BBB@BBB.BBB | (1.25, 1.30) | mQGiBDxD/tERBADPOQ192X.... |
| C | CCC@CCC.CCC | ... | ... |
| D | DDD@DDD.DDD | ... | ... |
| E | EEE@EEE.EEE | ... | ... |
| F | FFF@FFF.FFF | ... | ... |
| G | GGG@GGG.GGG | ... | ... |
| H | HHH@HHH.HHH | ... | ... |

MEDIA KEY (128 BITS: PRODUCED BASED
UPON PSEUDO-RANDOM NUMBER)

Km = "25U7M3BumJR6bIP"

MEDIA KEY ENCRYPTED BASED
UPON PUBLIC KEY "Kp1"

C(Kp1, Km) ="EAF0spSQyOuxZdiI"

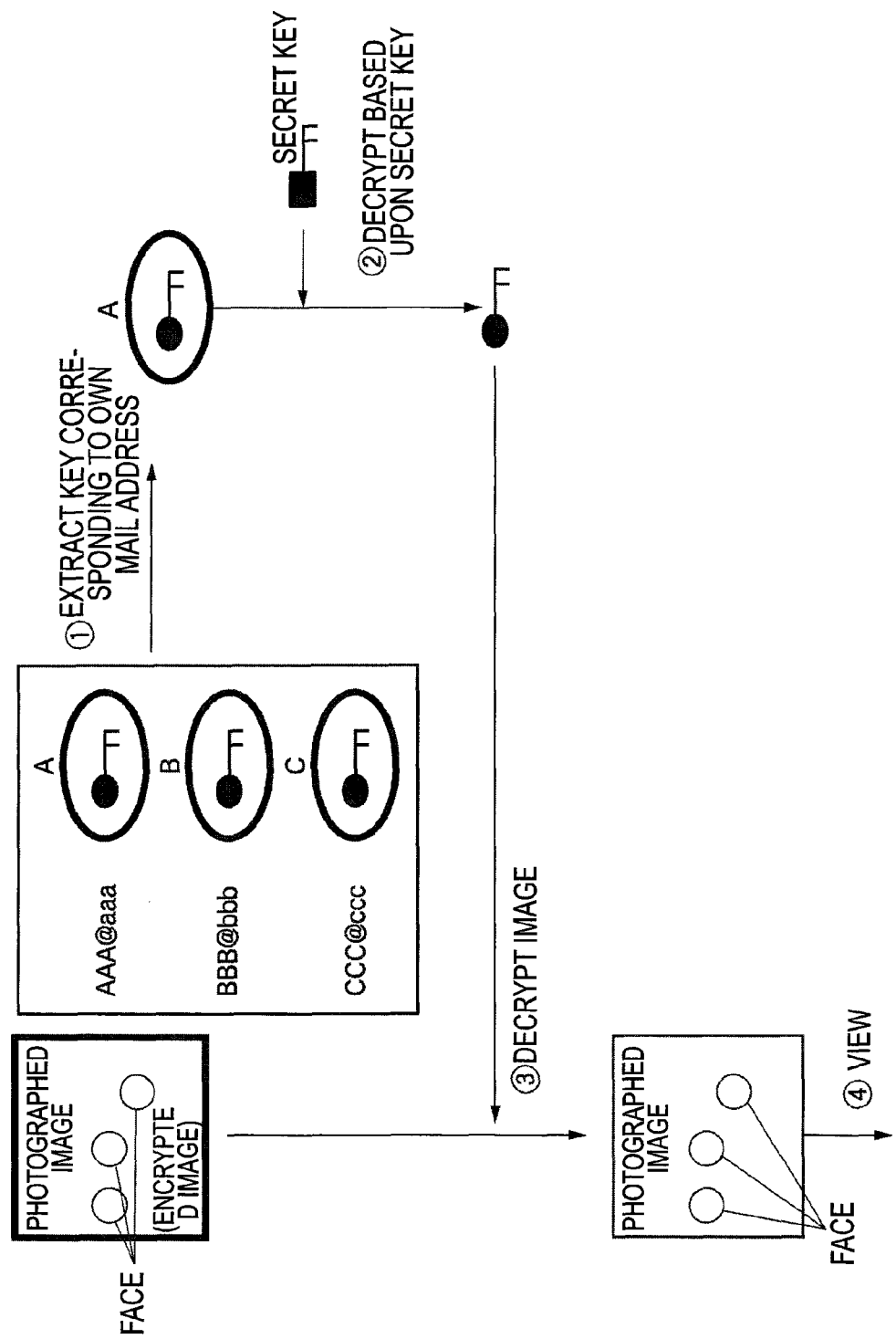

MEDIA DATA PROCESSING APPARATUS AND MEDIA DATA PROCESSING METHOD

TECHNICAL FIELD

The present invention is related to a media data processing apparatus into which media data containing at least one image information is inputted so as to produce encrypted media data.

BACKGROUND ART

Very recently, various sorts of imaging subjects are photographed by employing, for instance, portable telephone terminals equipped with cameras, digital cameras, digital video cameras, and the like, so that media data containing still images, moving pictures, voice information, and so on can be produced in a simple manner. Also, acquired media data may be easily distributed by utilizing electronic mails, or may be readily distributed via servers present on the Internet.

On the other hand, when media data have been acquired by photographing imaging subjects including persons, since personal information is contained in the media data, privacy problems may occur. For example, there are many possibilities that a specific person who has been photographically taken in a photograph has a desire that this photograph is not wanted to be viewed by any persons other than herself. As a consequence, if media data containing photographs and the like flow out with respect to a third party and/or on the Internet, then the photograph of the specific person may be viewed by the third party, so that her privacy of the specific person may be intruded.

However, for instance, even in such a case that media data containing a photograph is transferred from a photographer with respect to a specific person photographically taken in this photograph based upon a formal procedure, if servers provided on the Internet and electronic mails are utilized so as to transfer the media data, then there are some possibilities that the media data may flow out via the Internet with respect to a third party. As a consequence, in the case that such a media data is transferred via the Internet, the following idea is desirably required: That is, in this idea, after the media data is encrypted, the encrypted media data is transferred via the Internet; and even when the media data flows out with respect to a third party, the third party cannot view the photograph of the media data.

For instance, in a technical idea disclosed in a patent publication 1, the automatic photographing apparatus produces the client ID every photographing operation, and transfers the produced client IDs to the photographed persons (clients). In this case, the photographed persons can access the servers by utilizing the received client IDs so as to view the relevant photographs. However, since a third party who does not know the client IDs cannot view the photographs, privacy can be protected.

Also, in a technical idea disclosed in a patent publication 2, such a technical idea has been proposed. That is, an image is automatically transmitted via a mail with respect to a specific person specified based upon faces of persons contained in images acquired by photographing operations.

Patent Publication 1: JP-A-2004-54672
Patent publication 2: JP-A-2005-267146

DISCLOSURE OF THE INVENTION

Problems that the Invention is to Solve

However, in such a case that the technical idea of the patent publication 1 is employed, the information of the client ID produced every photographing operation must be firmly managed on both the server side and the client side. As a consequence, a large amount of these client IDs must be managed on the server side, resulting in increases in facility costs and management costs. Also, if the client side does not memorize the information about the received client ID, then the client side cannot view the relevant photograph. As a result, the client side has such a cumbersome feeling that the client ID information must be memorized. Although the information about the client ID may be written on paper and/or may be memorized in a personal computer, since such a memorandum may be probably lost, it is conceivable that a authorized client cannot view the own photographs.

Also, when media data are transferred by utilizing electronic mails, even if the media data never flow out via the Internet with respect to a third party, it is not possible to avoid that the photographs are viewed by the third party in such a case that the third party may probably peep into a screen of a terminal (for example, portable telephone terminal equipped with camera) of a authorized mail receiving person, and in the case that the authorized mail receiving person may probably lose the terminal, and/or the lost terminal is stolen.

The present invention has an object to provide a media data processing apparatus and a media data processing method, capable of realizing protection of privacy and also capable of suppressing an increase of management costs and a deterioration of operability in such a case that media data containing image information of persons are managed.

Means for Solving the Problems

First invention is featured by such a media data processing apparatus into which media data containing at least one image information is inputted so as to produce encrypted media data, and which is provided with: biological feature extracting unit for extracting a feature of biological information which is related to at least one person contained in the image information from the media data inputted thereinto; and encrypting process unit for partially, or wholly encrypting the media data based upon the feature extracted by the biological feature extracting unit.

In the first invention, when the media data is encrypted, the data encryption is carried out by employing the feature of the biological information related to the person who has been included in the image information of the media data. Accordingly, when the original media data is restored from the encrypted media data, the feature of the biological information related to the person who has been included in the image of the above-described media data is required. As a consequence, if the person is such a authorized person to which the media data should be viewed, then the authorized person has the own biological information. As a result, although the authorized person can easily restore the original media data from the encrypted media data, the third party who does not have the relevant biological information can hardly restore the original media data. Moreover, since such specific information as IDs and passwords other than biological information is not required, users need not memorize, or need not store such information as the IDs and the passwords as memorandum, but the users can firmly restore original media data in a simple operation.

Second invention is featured by that in the first invention, the media data processing apparatus is further comprised of: personal information acquiring unit for acquiring information of a public key from the feature extracted by the biological feature extracting unit, the public key being previously allocated to a specific person corresponding to the feature; and in which the encrypting process unit encrypts the media data by employing information of a common key which has been previously prepared, or has been formed so as to produce first encrypted data, encrypts the information of the common key by employing the information of the public key acquired by the personal information acquiring unit so as to produce second encrypted data, and outputs encrypted data which contains both the first encrypted data and the second encrypted data.

In the second invention, since the first encrypted data has been encrypted based upon the information of the common key, the first encrypted data can be decrypted by utilizing the information of the common key. Also, since the second encrypted data has been encrypted based upon the information as to the public key of the specific person, in such a case that a person who tries to view the media data is a authorized user, this person can decrypt the second encrypted data by utilizing the secret key (being held only by person herself) corresponding to the own public key, so that the person can acquire the above-described information of the common key. As a consequence, the person can decrypt the first encrypted data by utilizing the acquired information of the common key, so that the person can restore the original media data.

For example, in such a case that a plurality of persons have been photographically taken in an image of media data, there are some possibilities that there are plural authorized users to which this image should be viewed. In such a case, if the media data whose information amount is large is encrypted based upon different public keys from each other with respect to each of the authorized users, then a huge information amount of encrypted data must be stored. As a consequence it is desirable to employ a common key in order that the media key is encrypted by such a format that can be commonly utilized by the plurality of users. Accordingly, for instance, if the second encrypted data is produced by employing the public keys which are independently provided with the respective authorized users to which the image should be viewed, and the second encrypted data is combined with the first encrypted data, then only such a person (single, or plural persons) who has been confirmed as a authorized user based upon biological information can acquire the common key from the second encrypted data, and can decrypt the first encrypted data based upon the acquired common key, so that the authorized user can view the media data.

Third invention is featured by that in the second invention, the personal information acquiring unit acquires mail address information which has been previously allocated to a specific person corresponding to the acquired pubic key; and the encrypting process unit transmits the produced encrypted data via an electronic mail, while the mail address information acquired by the personal information acquiring unit is employed as a destination.

In the third invention, the encrypted media data can be automatically transmitted as the electronic mail with respect to only the authorized user whose personal information has been contained in the media data.

Fourth invention is featured by that in the first invention, the encrypting process unit encrypts the media data by employing information of a first common key which has been previously prepared, or has been formed so as to produce first encrypted data, produces a hash value as a second common key, which is calculated while the feature extracted by the biological feature extracting unit is employed as a parameter, encrypts the information of the first common key by employing the information of the second common key so as to produce second encrypted data, and outputs encrypted data which contains both the first encrypted data and the second encrypted data.

In the fourth invention, since the first encrypted data has been encrypted based upon the information of the first common key, the first encrypted data can be decrypted by utilizing the information of the first common key. Also, since the second encrypted data has been encrypted based upon the feature of the biological information related to such a person corresponding to the authorized user, in such a case that a person who tries to view the media data is the authorized user, this authorized person can again produce information (may contain more or less error) equivalent to the second common key from the own biological information. As a result, the authorized user can decrypt the second encrypted data by utilizing the produced second common key so as to acquire the above-described information of the first common key. As a consequence, the authorized user can decrypt the first encrypted data by utilizing the acquired information of the first common key, so that the authorized user can restore the original media data.

Fifth invention is featured by that in the first invention, the encrypting process unit performs an encrypting process operation only to an area within the image of the media data, while the area contains at least a portion of the persons whose features have been extracted, in order that the area within the image is replaced by the encrypted data.

In the fifth invention, since the above-described feature is extracted from the information of the area equivalent to the face of the person contained in the image, various persons can be discriminated from each other. For instance, with respect to elements contained in the face such as an eyebrow, an eye, and a nose, relative distances and the like are investigated, so that the features required for discriminating the persons from each other can be extracted.

Sixth invention is featured by that in the fifth invention, in the case that a plurality of persons have been contained in one image of the media data, the biological feature extracting unit extracts features which are independently provided with respect to each of the plural persons.

In the sixth invention, the features are extracted which are independently provided with respect to each of these plural persons. As a result, even in the case that a plurality of persons have been included in a single image, it is possible to produce the encrypted data capable of discriminating whether or not each of these plural persons corresponds to the authorized user.

Seventh invention is featured by that in the fifth invention, the encrypting process unit performs an encrypting process operation only to an area within the image of the media data, while the area contains at least a portion of the persons whose features have been extracted, in order that the area within the image is replaced by the encrypted data.

In the seventh invention, only a portion, or all of areas of the person present within the image is replaced by the encrypted data. As a result, the encrypting operation can be minimized, so that the time required for the encrypting operation can be shortened. Also, as to an image area that has no relationship with privacy, any persons who are not the authorized user can view the image.

Eighth invention is featured by that in the seventh invention, the media data processing apparatus is further comprised of: decrypting process unit for decrypting the encrypted media data; and in which the decrypting process unit produces a common key from a feature contained in the latest image acquired by being photographed, and restores the encrypted area data contained in the media data by utilizing the common key.

In the eighth invention, the following case may be supposed: That is, a feature such as a face is acquired from a person who tries to view media data in, for example, real time, and then, a discrimination is made as to whether or not this person corresponds to the authorized user based upon the acquired feature in other words, when the authorized user tries to view the media data, this authorized user can produce the correct common key based upon the feature of the own biological information, so that the authorized user can decrypt the encrypted media data so as to view the decrypted media data.

Ninth invention is featured by that in the eighth invention, in the case that a plurality of persons have been contained in the image of the media data, the decrypting process unit restores the image data as to only one area corresponding to the feature extracted from the latest image within the image into which a plurality of areas encrypted every person have been contained.

In the ninth invention, in such a case that a plurality of persons are included in an image to be viewed, only one authorized user who tries to view the image can decrypt such an area that the relevant person has been encrypted so as to view the decrypted image.

Tenth invention is featured by that in the eighth invention, in the case that a plurality of persons have been contained in the latest image acquired by being photographed, the decrypting process unit ceases restoring of the image data also as to the restorable area.

In the tenth invention, in such a case that a third party peeps into a screen of a terminal at the same time in addition to one authorized user who tries to view an image, even when the authorized user is present, restoring operation of the image data can be ceased.

Eleventh invention is featured by such a media data processing method by which media data containing at least one image information is inputted so as to produce encrypted media data, in which a feature of biological information is extracted from the media data to be inputted, the biological information being related to at least one person contained in the image information of the media data; and the media data is partially or wholly encrypted based upon the extracted feature.

In the eleventh invention a result can be achieved which is similar to the result obtained when the apparatus of the first invention is utilized.

ADVANTAGE OF THE INVENTION

In accordance with the present invention, in such a case that the media data containing the image information of the persons are managed the protection of the privacy can be realized, and the increase in the management costs and the deteriorations of the operability can be suppressed. In order words, in order to identify whether or not the operator is the authorized user whose viewing action should be permitted, the biological information of the person is utilized. As a result, the privacy of the person can be firmly protected, and moreover, IDs, passwords, and the like are not required to be managed so that the cost-up aspect for managing the media data can be suppressed. Also, the users need not memorize the IDs, the passwords, and the like, so that the operability can also be improved.

BRIEF DESCRIPTION OF THE DRAWINGS

FIG. 8 is a schematic diagram for showing another concrete example of data related to the media data processing apparatus shown in FIG. 2.

FIG. 22 is a schematic diagram for indicating a content of processing operation performed in the terminal shown in FIG. 4.

Figure 1:
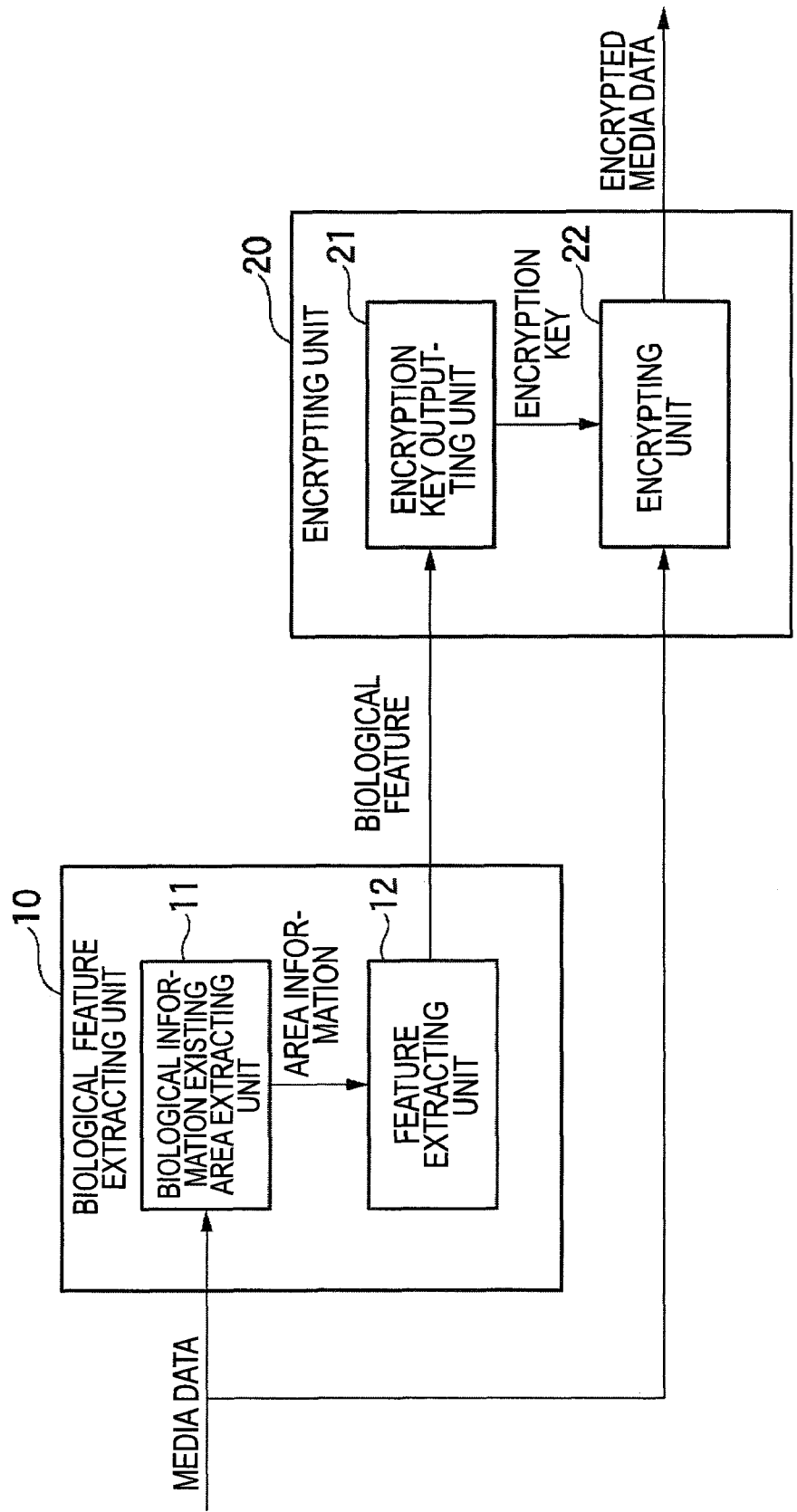
FIG. 1 is a block diagram for showing a basic arrangement of a media data processing apparatus according to a first embodiment mode of the present invention.

DESCRIPTION OF REFERENCE NUMERALS AND SIGNS 5,6 photographing unit
10, 15 biological feature extracting unit 11 biological information existing area extracting unit
12 feature extracting unit
20,20B,20C encrypting unit
21,21B encryption key outputting unit
22,22B,22C encrypting process unit
23 address book holding unit
25 encrypting unit
30 electronic mail transmitting unit
35 storage unit
36 image display instruction inputting unit
40 electronic mail receiving unit
50,50B decrypting unit
51 decrypting process unit
52 secret key holding unit
60 mail address holding unit
65 display unit

BEST MODE FOR CARRYING OUT THE INVENTION

First Embodiment Mode

Referring now to FIG. 1 to FIG. 9, FIG. 21 and FIG. 22, a description is made of one embodiment mode related to a media data processing apparatus and a media data processing method, according to the present invention.

Figure 2:
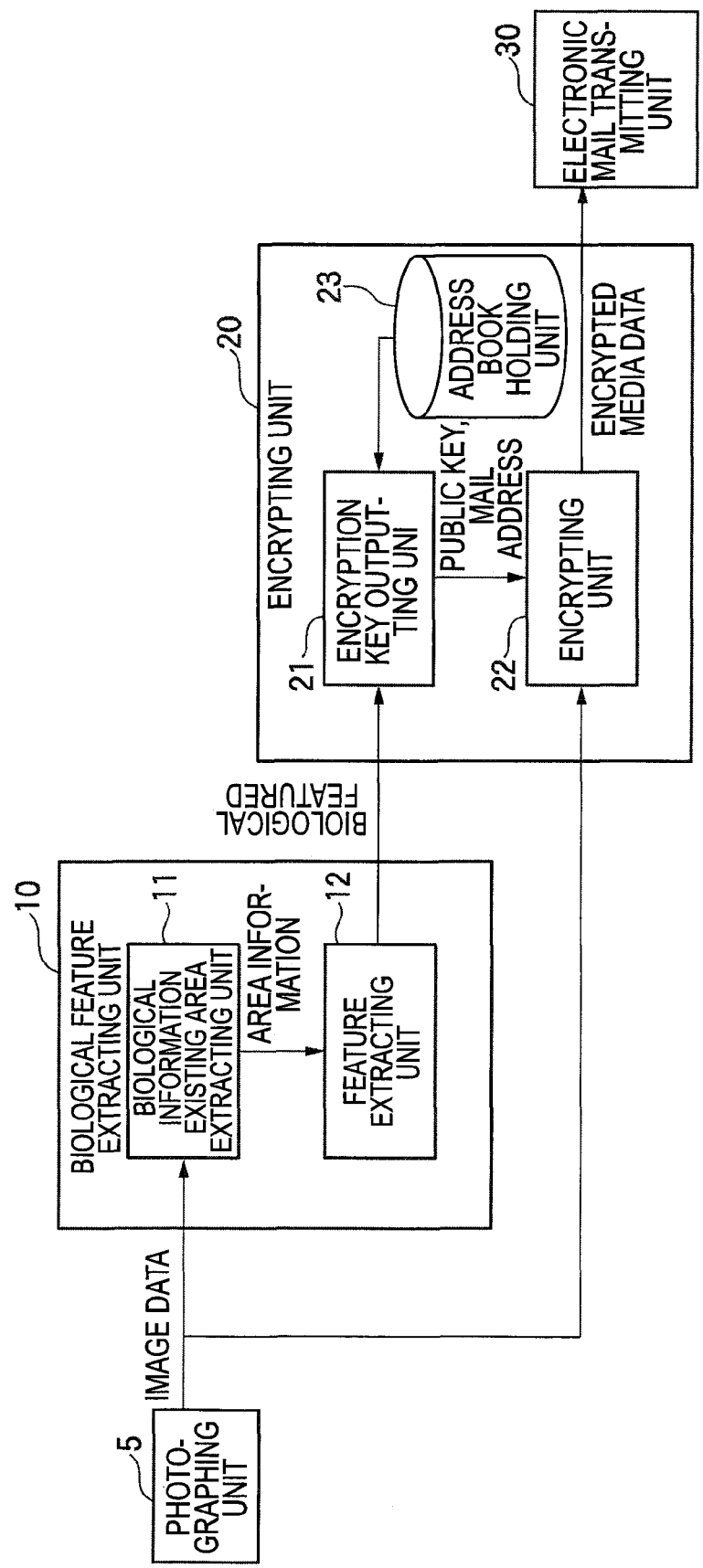
FIG. 2 is a block diagram for indicating a concrete structural example of the media data processing apparatus according to the first embodiment mode.
Figure 3:
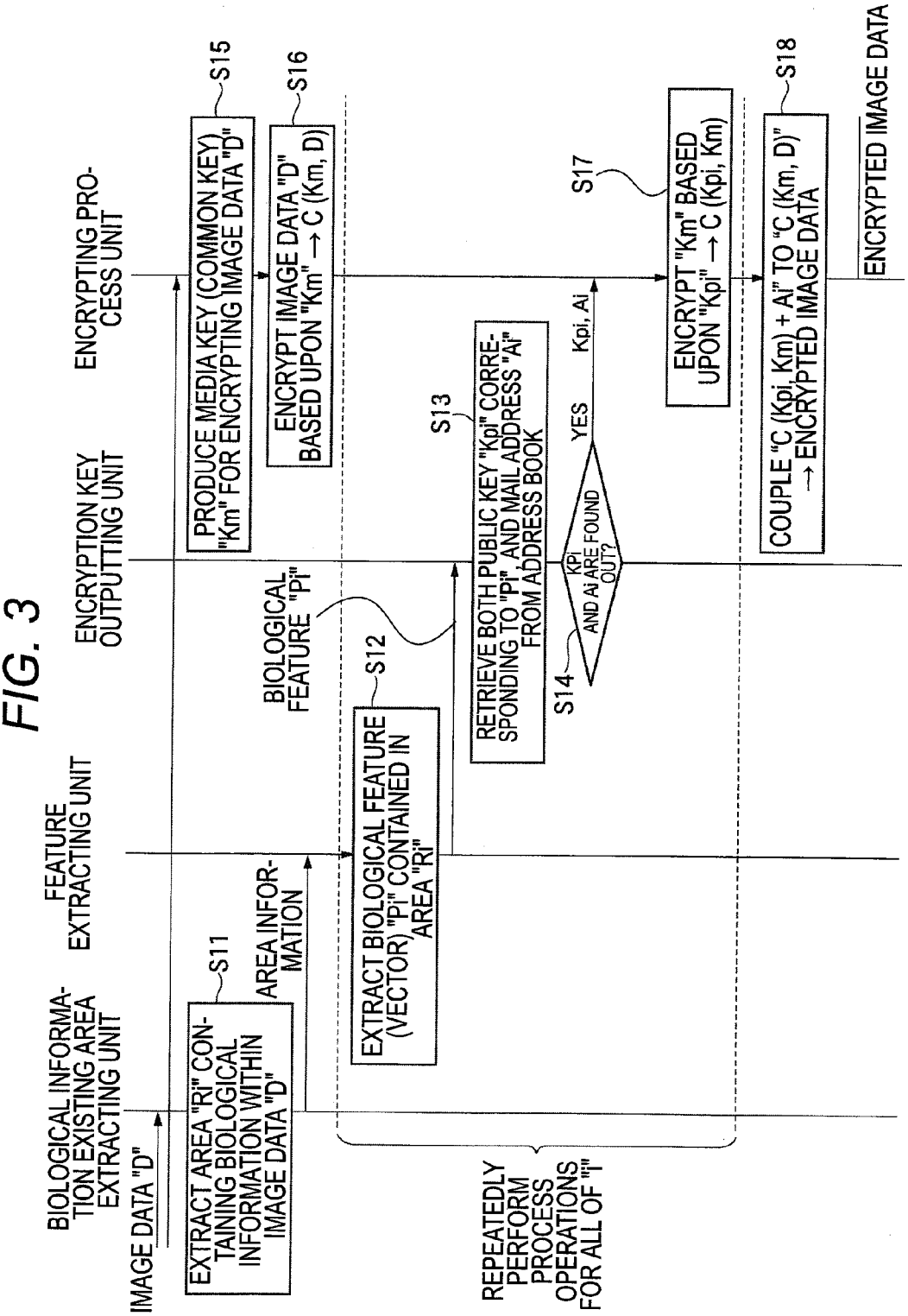
FIG. 3 is a flow chart for describing major operations of the media data processing apparatus indicated in FIG. 2.
Figure 4:
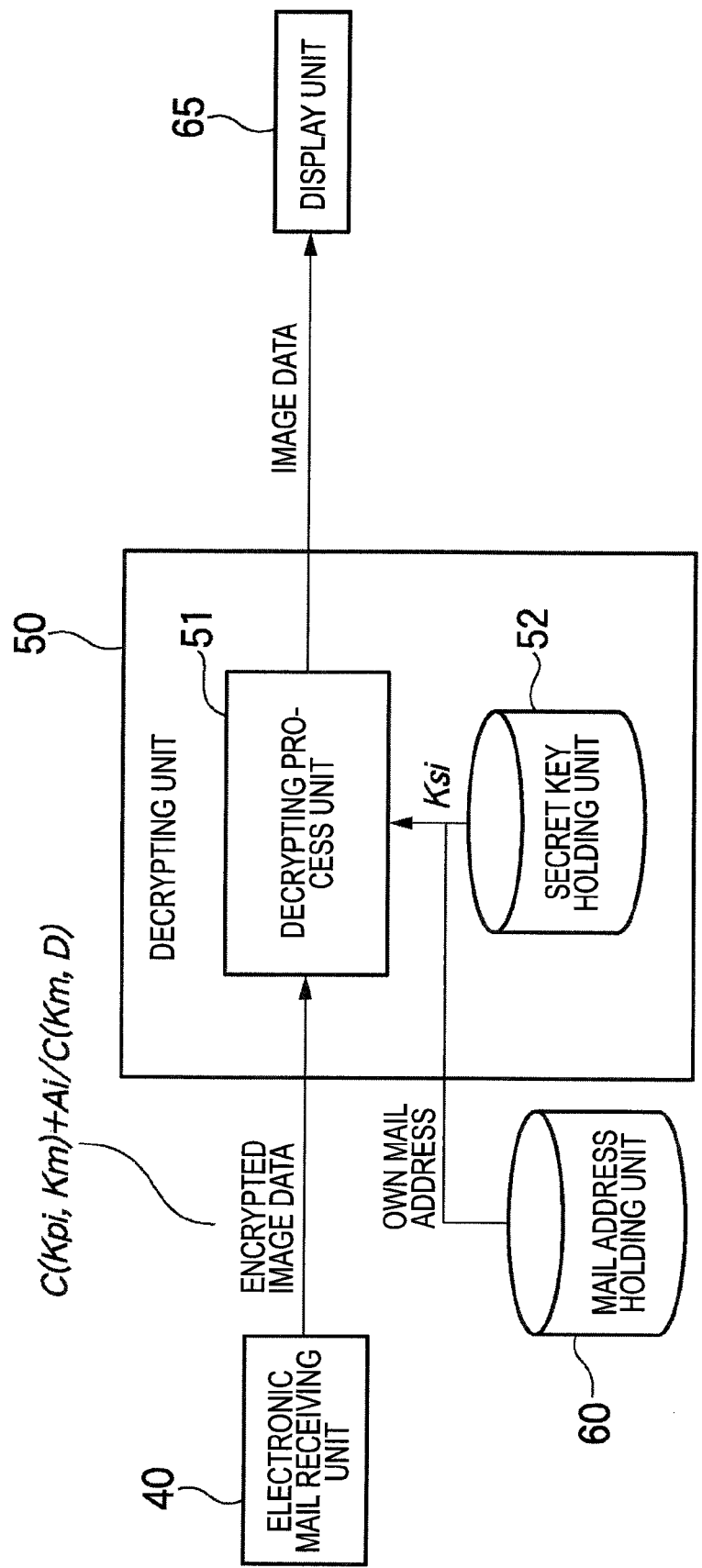
FIG. 4 is a block diagram for representing a structural example of a terminal that receives electronic mail transmitted from the apparatus indicated in FIG. 2.
Figure 5:
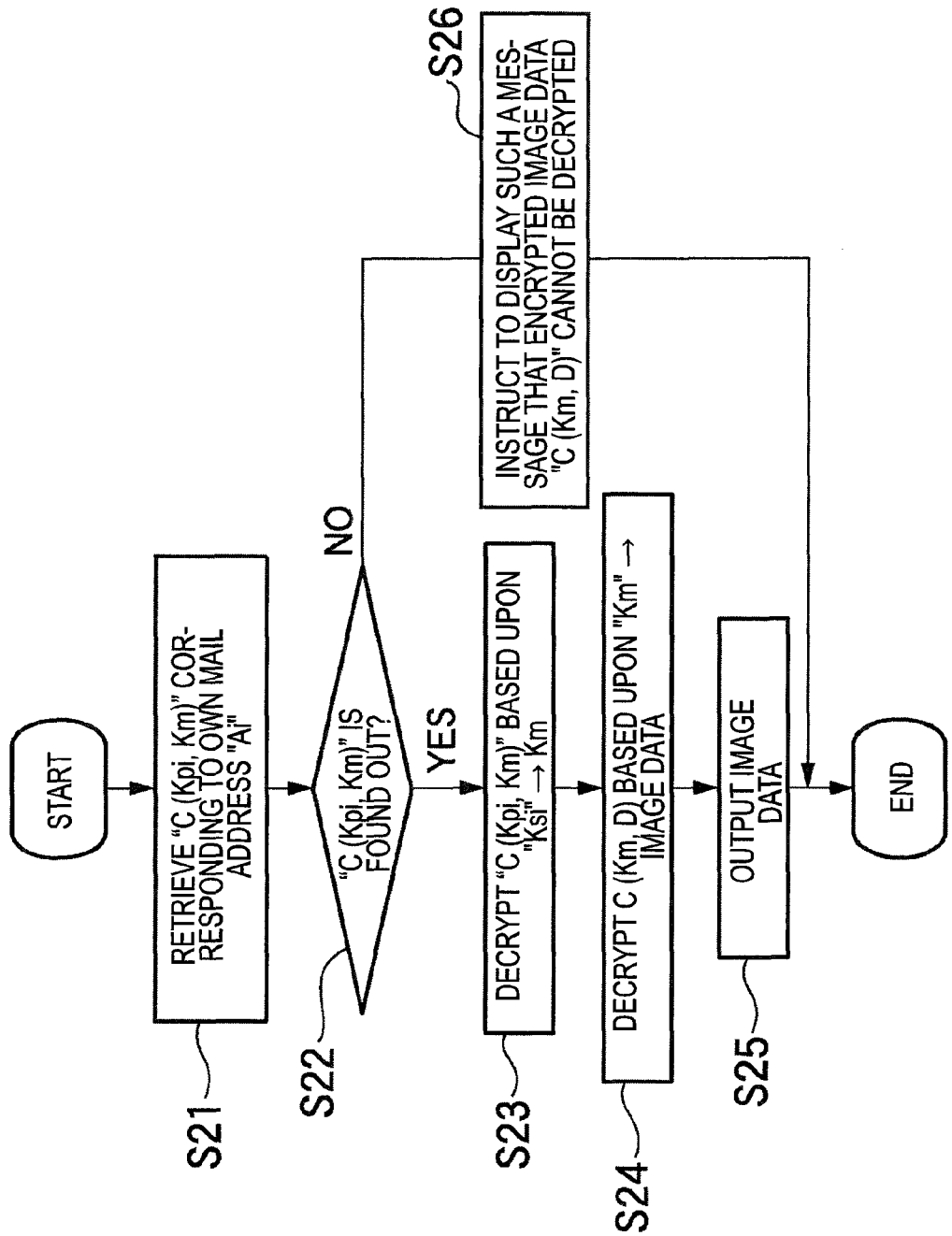
FIG. 5 is a flow chart for indicating major operations of the terminal shown in FIG. 4.
Figure 6:
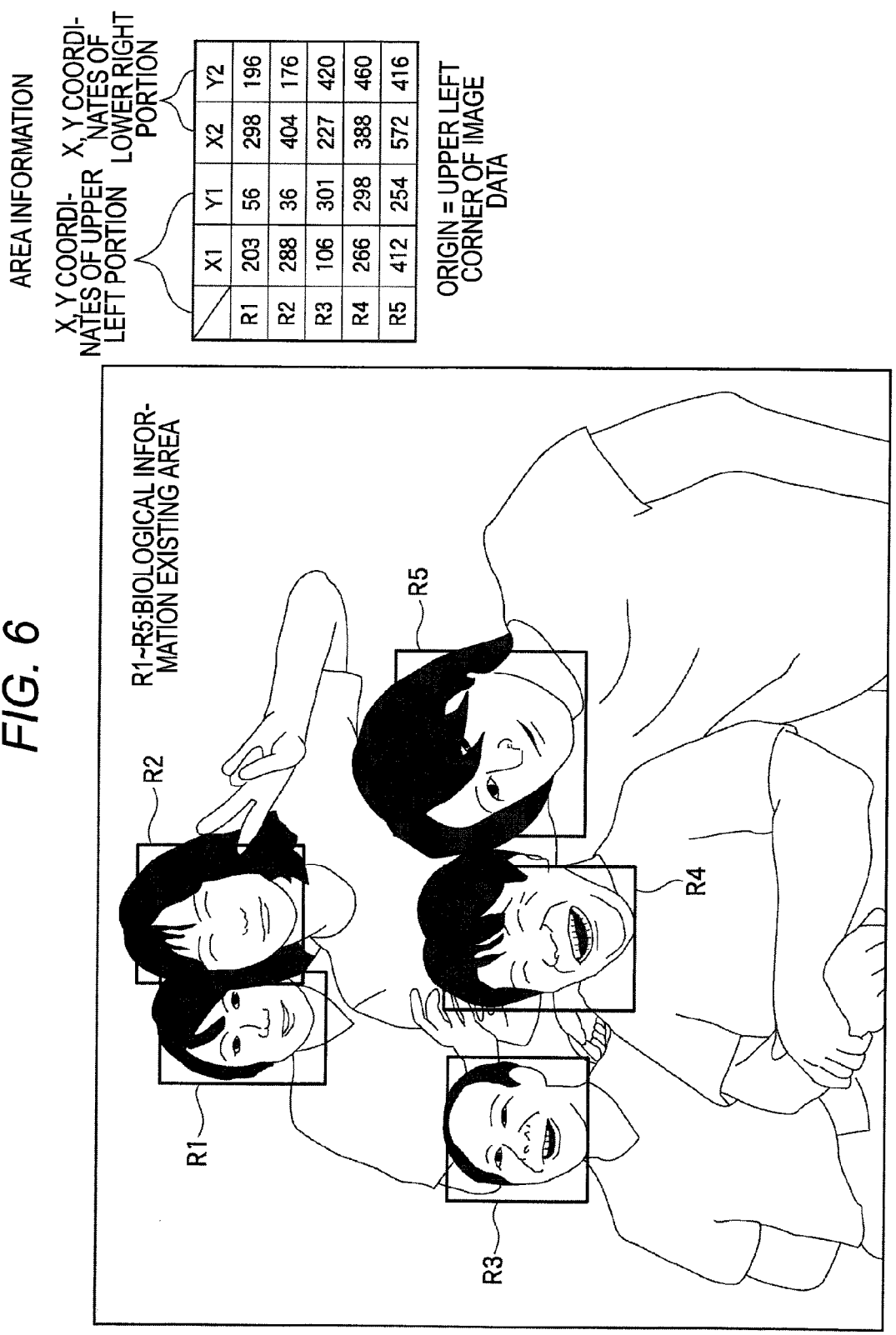
FIG. 6 is a schematic diagram for showing a concrete example of data related to the media data processing apparatus shown in FIG. 2.
Figure 7:
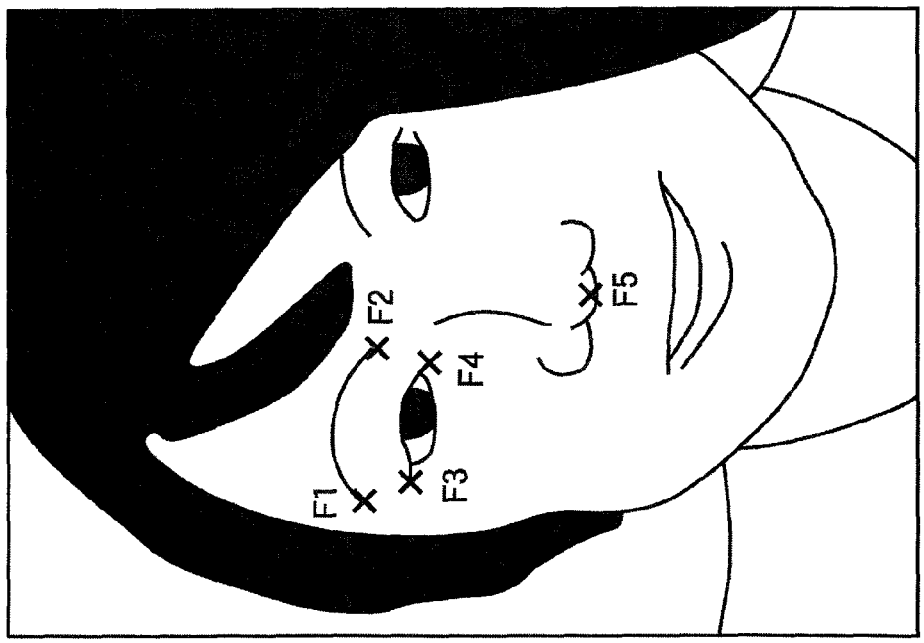
FIG. 7 is a schematic diagram for representing another concrete example of data related to the media data processing apparatus indicated in FIG. 2.
Figure 9:
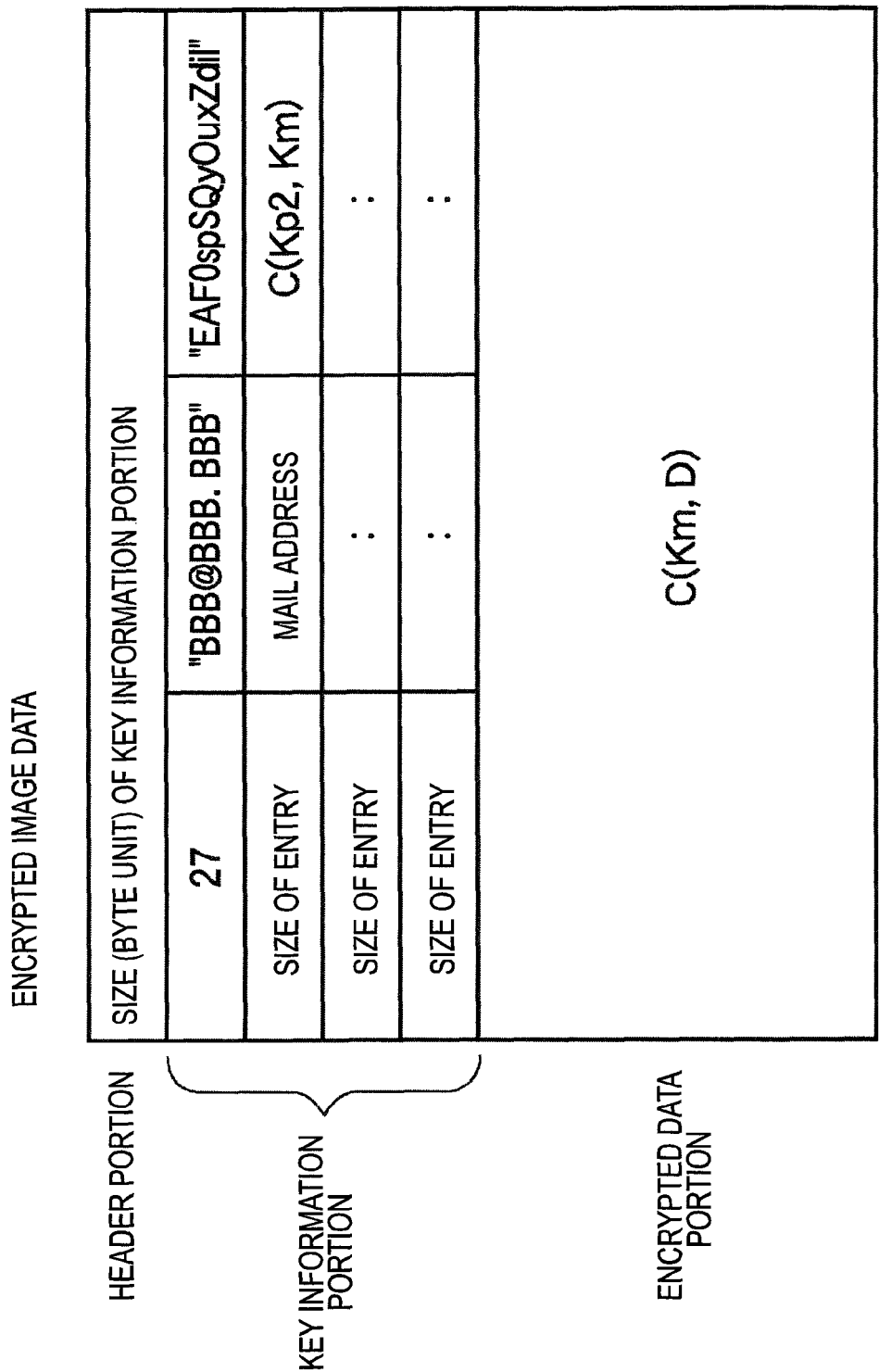
FIG. 9 is a schematic diagram for representing another concrete example of data related to the media data processing apparatus indicated in FIG. 2.
Figure 21:
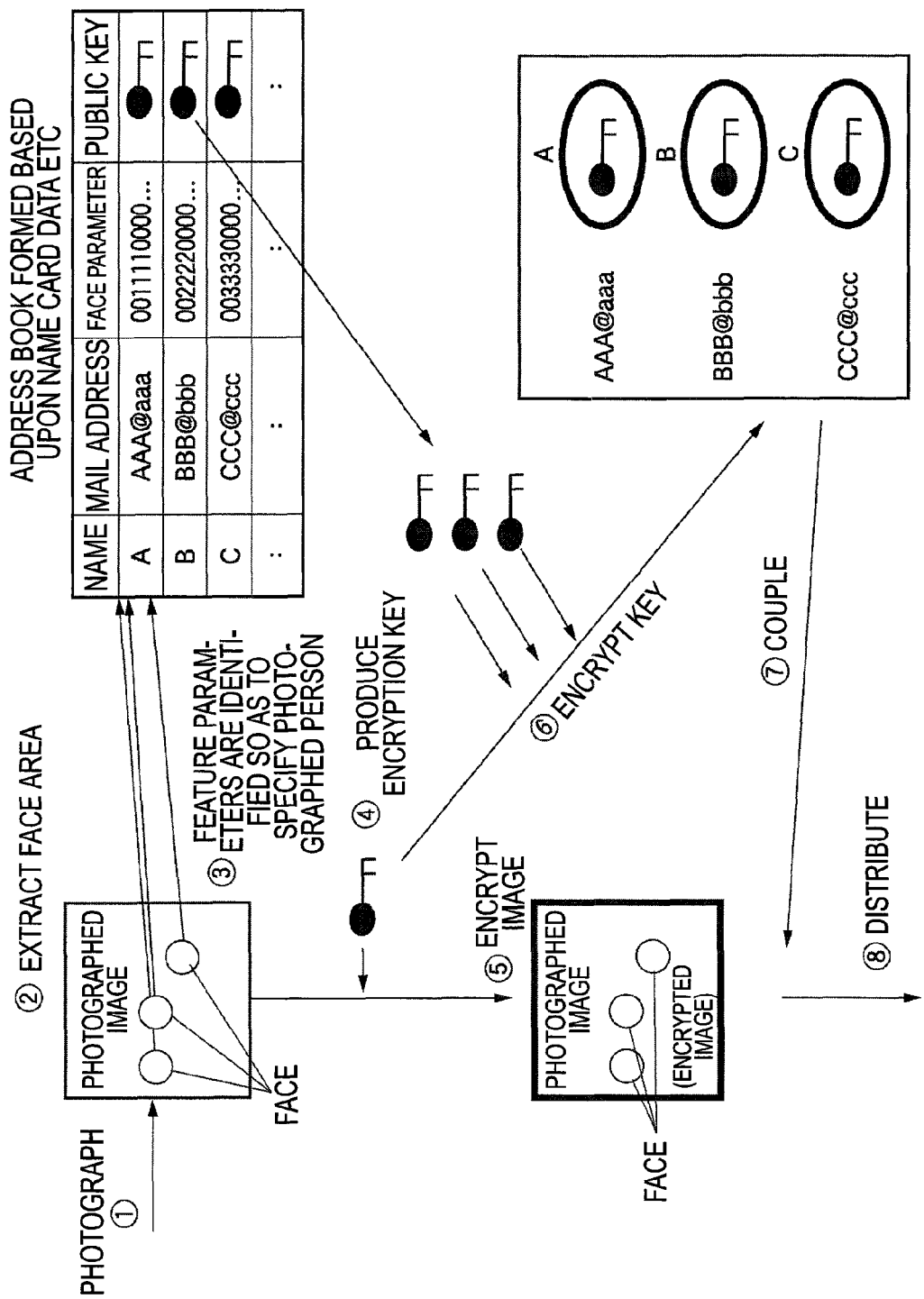
FIG. 21 is a schematic diagram for showing a content of processing operations performed in the media data processing apparatus indicated in FIG. 2.

FIG. 1 is a block diagram for showing a basic arrangement of a media data processing apparatus according to a first embodiment mode of the present invention. FIG. 2 is a block diagram for indicating a concrete structural example of the media data processing apparatus according to the first embodiment mode. FIG. 3 is a flow chart for describing major operations of the media data processing apparatus indicated in FIG. 2. FIG. 4 is a block diagram for representing a structural example of a terminal that receives electronic mail transmitted from the apparatus indicated in FIG. 2. FIG. 5 is a flow chart for indicating major operations of the terminal shown in FIG. 4. FIG. 6 is a schematic diagram for showing a concrete example of data related to the media data processing apparatus shown in FIG. 2. FIG. 7 is a schematic diagram for representing another concrete example of data related to the media data processing apparatus indicated in FIG. 2. FIG. 8 is a schematic diagram for showing another concrete example of data related to the media data processing apparatus shown in FIG. 2. FIG. 9 is a schematic diagram for representing another concrete example of data related to the media data processing apparatus indicated in FIG. 2. FIG. 21 is a schematic diagram for showing a content of processing operations performed in the media data processing apparatus indicated in FIG. 2. FIG. 22 is a schematic diagram for indicating a content of processing operation performed in the terminal shown in FIG. 4.

A first description is made of a basic arrangement and operations of the media data processing apparatus with reference to FIG. 1. As shown in FIG. 1 the media data processing apparatus has been equipped with a biological feature extracting unit 10 and an encrypting unit 20. Also the biological feature extracting unit 10 has been equipped with a biological information existing area extracting unit 11 and a feature extracting unit 12, while the encrypting unit 20 has been provided with an encryption key outputting unit 21 and an encrypting process unit 22.

It should be understood that respective functions of the biological feature extracting unit 10 and the encrypting unit 20 may be constructed of exclusively-used hardware (electronic circuit), and may be alternatively realized by a program executed by a control-purpose computer.

Predetermined media data is inputted to both the biological feature extracting unit 10 and the encrypting unit 20 as data that should be processed. As actual media data, for example, image data containing only still images such as photographs, video data produced by combining moving pictures with voice information, and the like may be predicted.

The biological information existing area-extracting unit 11 provided in the biological feature extracting unit 10 extracts an area where biological information exists from the media data. For example, an area of a face of a person contained in an image, an area of voice of a person contained in voice data, and the like are extracted by the biological information existing area extracting unit 11.

The feature extracting unit 12 extracts biological feature indicative of a feature of a specific person from the data of the area extracted by the biological information existing area extracting unit 11. For instance, the biological feature may be extracted by calculating relative dimensions and relative distances related to such elements as an eyebrow, an eye, and a nose from face data of a person photographically taken in an image.

On the other hand, the encryption key outputting unit 21 of the encrypting unit 20 outputs an encryption key in response to the biological feature extracted by the feature extracting unit 12. Also, the encrypting process unit 22 encrypts the media data to be processed by employing the encryption key outputted by the encryption key outputting unit 21 so as to output encrypted image data.

As a consequence, in such a case that the encrypted image data outputted from this media data processing apparatus is tried to be viewed, since the biological feature indicative of the specific person is required, for example, if a user corresponds to such a person who is being photographically taken in the image contained in the media data, then this user can easily decrypt the encrypted image data. However, a third party can very hardly decrypt this encrypted image data. Also, since the media data is encrypted based upon the biological feature, the ID information and the password are not required, but if the user corresponds to such a authorized user as the person who is being photographically taken in the image, then this authorized user can view the encrypted image data in a simple operation.

Next, furthermore, a description is made of a concrete structural example. A media data processing apparatus shown in FIG. 2 assumes such a case that the present invention is applied to a terminal, for example, a portable telephone terminal equipped with a camera. Also, in the example of FIG. 2, such a case is assumed that as the media data, image data of a photograph photographed by the camera is utilized.

The media data processing apparatus shown in FIG. 2 has been equipped with a photographing unit 5, a biological feature extracting unit 10, an encrypting unit 20, and an electronic mail transmitting unit 30. The photographing unit 5 photographs a photographic subject containing a person and the like in response to an input operation of a user so as to produce image data such as a still image. The image data produced by the photographing operation of the photographing unit 5 is inputted to the biological feature extracting unit 10 and the encrypting unit 20.

Similar to FIG. 1, the biological feature extracting unit 10 has been equipped with a biological information existing area extracting unit 11 and a feature extracting unit 12. The encrypting unit 20 has been provided with an address book holding unit 23 in addition to an encryption key outputting unit 21 and an encrypting process unit 22.

The encryption key outputting unit 21 shown in FIG. 2 derives personal information of a person who is defined in correspondence with the biological feature outputted from the feature extracting unit 12, and then, applies information about a public key and a mail address, which have been allocated to the above-described person, to the encrypting process unit 22. It should also be noted that instead of the address book holding unit 23, the structure may be alternatively changed in such a manner that the personal information is acquired via a network.

Also, the encrypting process unit 22 indicated in FIG. 2 encrypts the image data outputted from the photographing unit 5 by employing the public key and the mail address outputted from the encryption key outputting unit 21, and then, outputs the image data which has been encrypted. The electronic mail transmitting unit 30 automatically transmits the encrypted image data outputted by the encrypting process unit 22 as an electronic mail to a specific destination.

Next, a description is made of contents of the concrete processing operation by the media data processing apparatus shown in FIG. 2 with reference to FIG. 3.

When image data "D" outputted by the photographing unit 5 is entered to the biological information existing area extracting unit 11, the process operation of the biological information existing area extracting unit 11 is advanced to a step S11, and then, extracts an "i"th area "Ri" containing the biological information within the image data "D." In the case that a plurality of persons have been photographically taken in one piece of the image data "D", the biological information existing area extracting unit 11 extracts areas corresponding to the respective persons.

For instance, since five persons have been photographically taken in the image data "D" indicated in FIG. 6, rectangular areas R1, R2, R3, R4, and R5 where faces of the respective five persons are present are specified so as to be extracted by the biological information existing area extracting unit 11. As information for specifying each of these areas as represented in FIG. 6, XY coordinates at an upper left position and XY coordinates of a lower right position of a rectangle may be employed.

When the area information is entered from the biological information existing area extracting unit 11 to the feature extracting unit 12, the process operation of the feature extracting unit 12 is advanced to a process operation of a step S12 so as to extract biological feature "Pi" which is contained in the "i"th area "Ri" within the image data.

For instance, as represented in FIG. 7, the feature extracting unit 12 acquires positional coordinates as to edge points F1 and F2 of an eyebrow, edge points F3 and F4 of an eye, and a lower edge F5 of a nose, which have been contained in a face of a person corresponding to the image of the "i"th area "Ri." Then, the feature extracting unit 12 calculates a ratio "α" of (distance between edge points F1–F2) to (distance between edge points F3–F4); calculates another ratio "β" of (distance between edge points F2–F5) to (distance between edge points F4–F5); and then, can determine such a biological feature "P1" while the above-described ratios "α" and "β" are employed as a parameter. This biological feature "P1" can be utilized in order to discriminate a specific person, namely the person who is being photographically taken in the "i"th area "Ri" from other persons.

When the biological feature "Pi" is entered from the feature extracting unit 12, the process operation of the encryption key outputting unit 21 is advanced to a process operation of the step S13 so as to retrieve both a publication key "Kpi" and an address "Ai" allocated to the biological feature "Pi" on the address book holding unit 23.

For example, as represented in FIG. 8, since personal information corresponding to each of large numbers of persons has been previously registered in the address book holding unit 23, the personal information about the specific person, which corresponds to the biological feature "Pi" outputted by the feature extracting unit 12 can be acquired. In an actual case, there are some possibilities that an error may be produced between the biological feature of each of the persons held in the address book holding unit 23 and the biological feature "Pi" extracted by the feature extracting unit 12 from the image data to be processed. As a consequence, in the step S13, such a biological feature that a difference (distance) from the biological feature "Pi" is defined within a predetermined value (on the order of producible error) may be retrieved on the address book holding unit 23.

When the retrieving operation of the biological feature can succeed in the step S13, the encryption key outputting unit 21 gives the information about the public key "Kpi" and the mail address "Ai" allocated to the relevant person to the encrypting process unit 22.

On the other hand, when the image data "D" to be processed is inputted from the photographing unit 5, the process operation of the encrypting process unit 22 is advanced to a process operation of a step S15. In this step S15, the encrypting process unit 22 produces a media key (common key) "Km" which is employed in an encrypting operation. In an actual case, for example, such a media key "Km" as indicated in FIG. 8 may be produced by employing a pseudo-random number which is produced by a random number generating process operation. This media key "Km" is a key which is generated with respect to each of images to be processed, and corresponds to a common key which has no relationship with the persons contained in the image.

In a step S16, the encrypting process unit 22 performs an encrypting process operation with respect to the image data "D" by employing the media key "Km" generated in the step S15. As a result, encrypted image data (which is expressed as "C (Km, D))" is generated.

Also, when the information as to the public key "Kpi2 and the mail address "Ai" is inputted from the encryption key outputting unit 21, which has been allocated to the specific person, the encrypting process unit 22 is advanced to a process operation of a step S17. In this step S17, the encrypting process unit 22 encrypts the media key "Km" produced in the step S15 by employing the public key "Kpi" inputted from the encryption key outputting unit 21 so as to produce, for example, such an encrypted media key (which is expressed as "C (Kpi, Km))" as indicated in FIG. 8.

It should also be noted that when a plurality of persons have been photographically taken in image data of 1 frame, the process operations defined in the steps S12, S13, S14, and S17 are repeatedly executed plural times equal to a total number of these persons. As a consequence, in such a case that the plurality of persons have been photographically taken in the image data, the encrypted media key "C (Kpi, Km)" is sequentially produced plural times equal to the total number of these persons.

In a step S18, the encrypted media key "C (Kpi, Km)" generated in the step S17, the mail address "Ai" of the relevant person, and the encrypted image data "C (Km, D)" generated in the step S16 are coupled with each other in order to produce encrypted image data. FIG. 9 represents a concrete example of the encrypted image data generated in the step S18.

The encoded image data shown in FIG. 9 has been constituted by a header portion, a key information portion, and an encrypted data portion. In the header portion of the encoded image data, information indicative of a size of the key information portion is stored; in the key information portion, as to each of a plurality of entries (equivalent to plurality of persons), a size, a mail address "Ai", and an encrypted media key "C (Kpi, Km)" are stored; and also, in the encrypted data portion, the encrypted image data "C (Km, D)" generated in the step S16 are stored.

Since such an encrypted image data is inputted to the electronic mail transmitting unit 30, the electronic mail transmitting unit 30 specifies a mail address "Ai" of a transmission destination from the content of the encrypted image data entered to the electronic mail transmitting unit 30, and can automatically transmit this encrypted image data by an electronic mail. In other words, the electronic mail is automatically transmitted while such a mail address is employed as a destination, which has been allocated to a person photographically taken in the encrypted image data.

Next, a description is made of a structure and operations of a reception-sided terminal which receives an electronic mail transmitted by the electronic mail transmitting unit 30. FIG. 4 indicates a structural example of the terminal on the reception side. As the terminal on the reception side, a portable telephone terminal, and the like may be conceived. Referring now to FIG. 4, this reception-sided terminal has been equipped with an electronic mail receiving unit 40, a decrypting unit 50, a mail address holding unit 60, and a display unit 65, while the decrypting unit 50 has been equipped with a decrypting process unit 51 and a secret key holding unit 52.

An electronic mail transmitted from another terminal on the transmission side is entered via a predetermined communication network to the electronic mail receiving unit 40 of the terminal on the reception side. The electronic mail receiving unit 40 outputs the encrypted image data (refer to FIG. 9) contained in the received electronic mail.

The mail address holding unit 60 has held data of a mail address that has been previously allocated to a mail receiving person. Also, the secret key holding unit 52 has held secret key "Ksi" which has been previously produced by the mail receiving person. This secret key Ksi has been owned only by the mail receiving person. Also, while a public key "Kpi" which constitutes a key pair with the secret key "Ksi" has been produced at the same time with the secret key "Ksi", the public key "Kpi" has been previously distributed to various persons. As a consequence, the public key "Kpi" of the mail receiving person has been present also in the above-described address book holding unit 28 provided in the terminal on the transmission side.

The decrypting process unit 51 of the decrypting unit 50 decrypts the encrypted image data entered from the electronic mail receiving unit 40 by employing both the mail address of the mail receiving person and the secret key "Ksi" so as to restore the image data before being encrypted. The display unit 65 displays the image data decrypted by the decrypting unit 50 on a screen as such an image as shown in, for example, FIG. 6.

Referring now to FIG. 5, a description is made of concrete contents as to process operations executed by the decrypting process unit 51.

In a step S21, the decrypting process unit 51 retrieves encrypted media key "C (Kpi, Km)" which corresponds to a mail receiving person from the key information portions contained in the encrypted image data by employing the mail address "Ai" of the mail receiving person herself inputted from the mail address holding unit 60. In other words, the decrypting process unit 51 seeks such a mail address that is coincident with the mail address "Ai" of the mail receiving person herself, and then, seeks the encrypted media key "C (Kpi, Km)" arranged next to the relevant mail address from the encrypted image data.

When the target encrypted media key "C (Kpi, Km)" is found out, the process operation of the decrypting process unit 51 is advanced from the step S22 to a step S23, whereas when the target encrypted media key "C (Kpi, Km)" is not found out, the process operation of the decrypting process unit 51 is advanced from the step S22 to a step S26.

In the step S23, the decrypting process unit 51 decrypts the encrypted media key "C (Kpi, Km)" extracted from the encrypted image data in the step S21 by employing the secret key "Ksi" of the mail receiving person herself from the secret key holding unit 52. As a result, the media key "Km."

In a step S24, the decrypting process unit 51 derives a content of the encrypted data portion contained in the encrypted image data, namely, encrypted image data "C (Km, D)", and then decrypts the encrypted image data "C (Km, D)" by employing the media key "Km" acquired in the step S23. As a result, the image data "D" before being encrypted may be restored.

In a step S25, the decrypting process unit 51 displays the image data "D" restored in the step S24 on the display unit 65.

In the step S26, the decrypting process unit 51 instructs the display unit 65 to display such a message for indicating that the encrypted image data cannot be decrypted.

In order to readily understand, the process flow operations related to the above-described media data processing apparatus will now be supplementarily explained. On the side of the photographing apparatus, namely, the media data processing apparatus shown in FIG. 2, such a process operation as indicated in FIG. 21 is carried out:
(1) An image containing persons is photographed by employing the camera.
(2) Face areas of the respective persons are extracted from an image to be processed.
(3) Feature parameters of the face areas of the respective persons are identified with data on an address book, which have been previously prepared, so that the photographed person is specified.
(4) An encryption key for encrypting image data, namely, a media key "Km" is produced.
(5) The image data is encrypted by the encryption key.
(6) In order that the encryption key itself does not flow out a third party, the encryption key is encrypted by employing a pubic key of the photographed person.
(7) The encrypted image data is coupled with the encrypted encryption key so as to produce transmission-purpose data.
(8) The produced encrypted data is distributed via an electronic mail, and the like.

On the other hand, on the side of the viewing apparatus, namely, in the reception-sided terminal shown in FIG. 4, such a process operation indicated in FIG. 22 is carried out.
(1) A key corresponding to a mail address of a mail receiving person herself is extracted from received image data that has been encrypted.
(2) Since the extracted key has been encrypted, the encrypted extracted key is decrypted by employing a secret key "Ksi" of the mail receiving person herself so as to restore the encryption key, namely, the media key "Km."
(3) The image data is decrypted by employing the obtained media key "Km."
(4) The decrypted image data is displayed so as to be viewed.

As a consequence, such a condition that the image data can be viewed is limited only to such a case that the mail receiving person has been photographically taken in the image data. Also, on the transmission side, the encryption is carried out based upon the feature of the biological information of the person who has been photographically taken in the image data. As a result, the special information such as IDs and passwords need not be managed on the transmission side and the reception side respectively.

Second Embodiment Mode

Referring now to FIG. 10 to FIG. 14, a description is made of another embodiment related to both the media data processing apparatus and the media data processing method according to the present invention.

Figure 10:
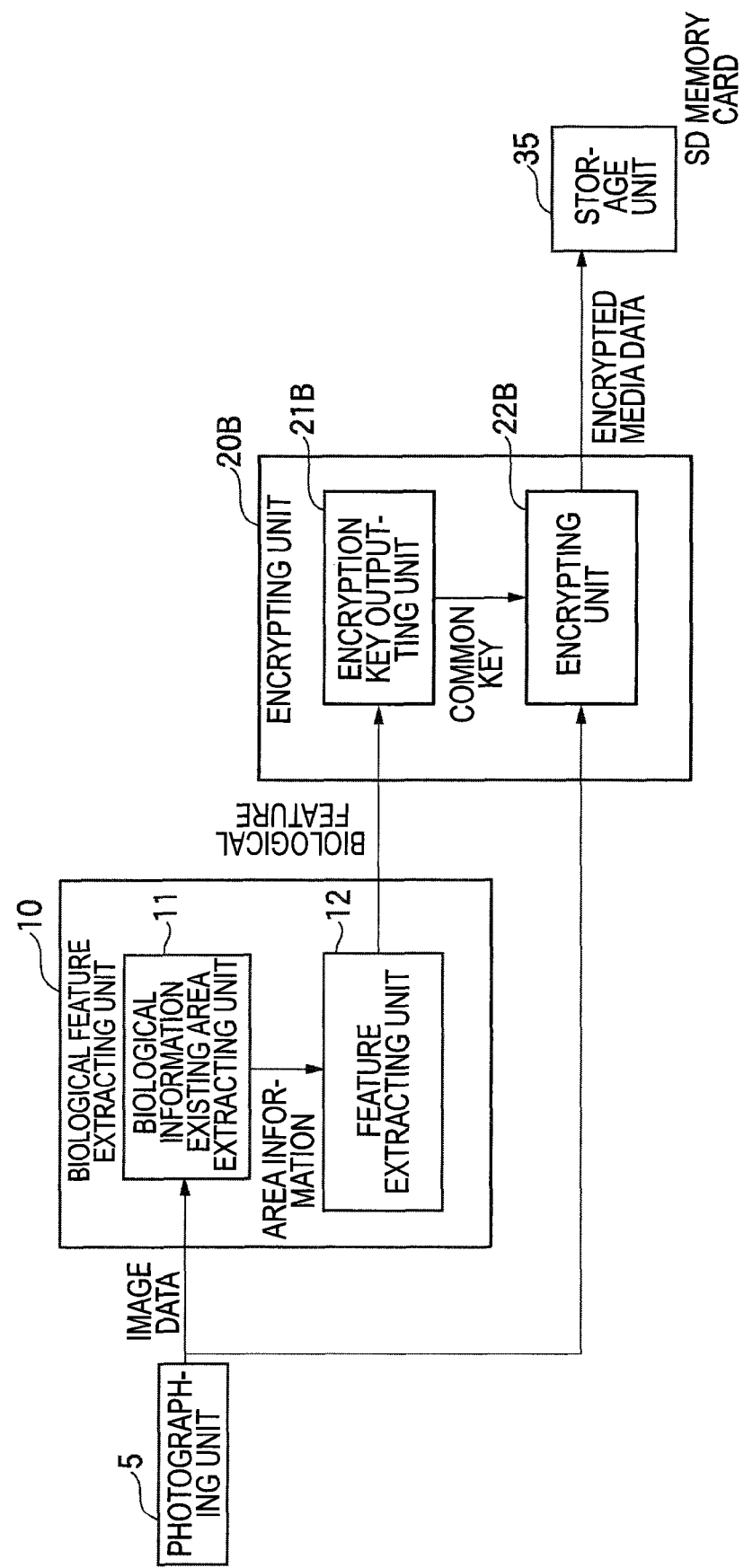
FIG. 10 is a block diagram for indicating a concrete structural example of a media data processing apparatus according to a second embodiment mode.
Figure 11:
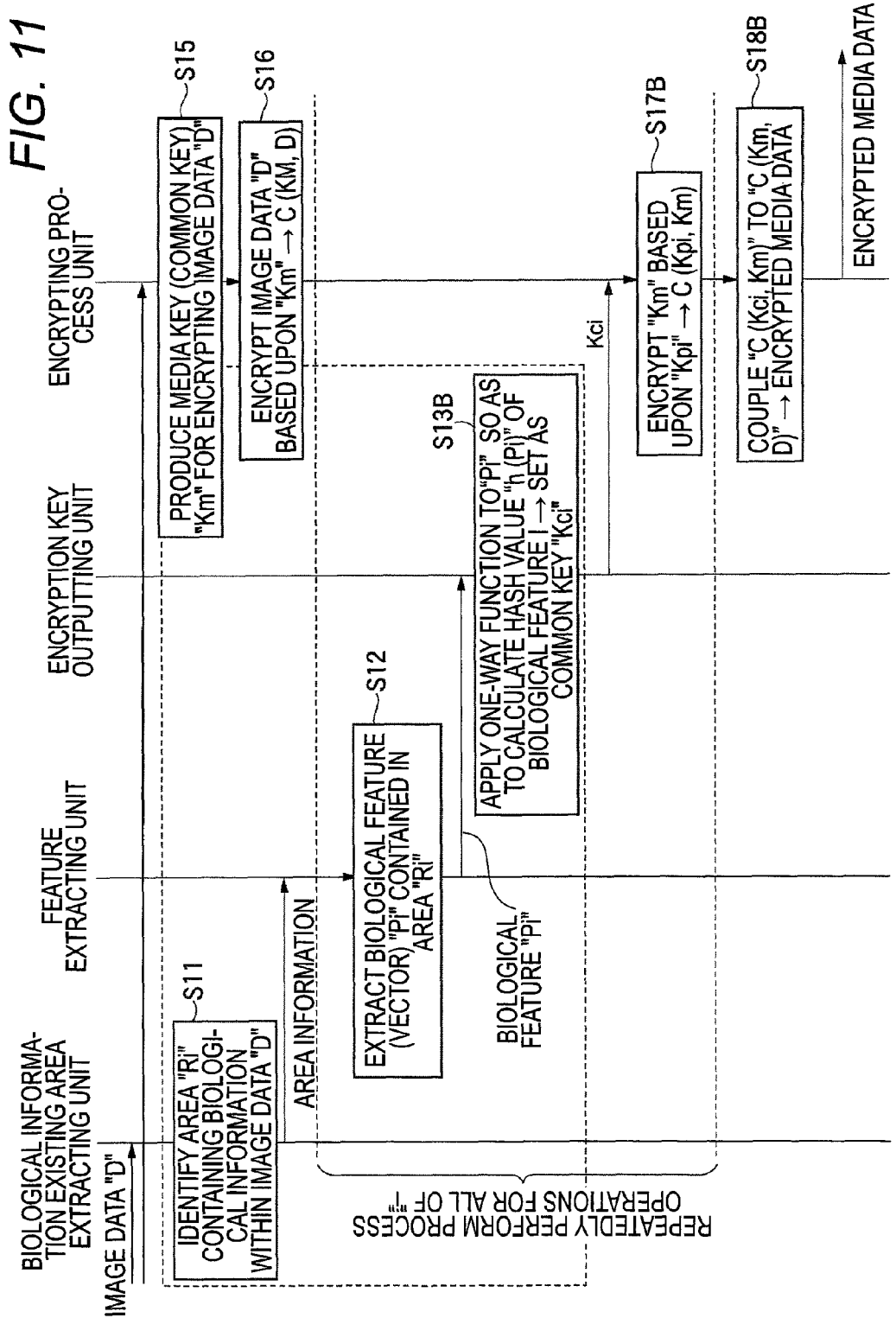
FIG. 11 is a flow chart for describing major operations of the media data processing apparatus indicated in FIG. 10.
Figure 12:
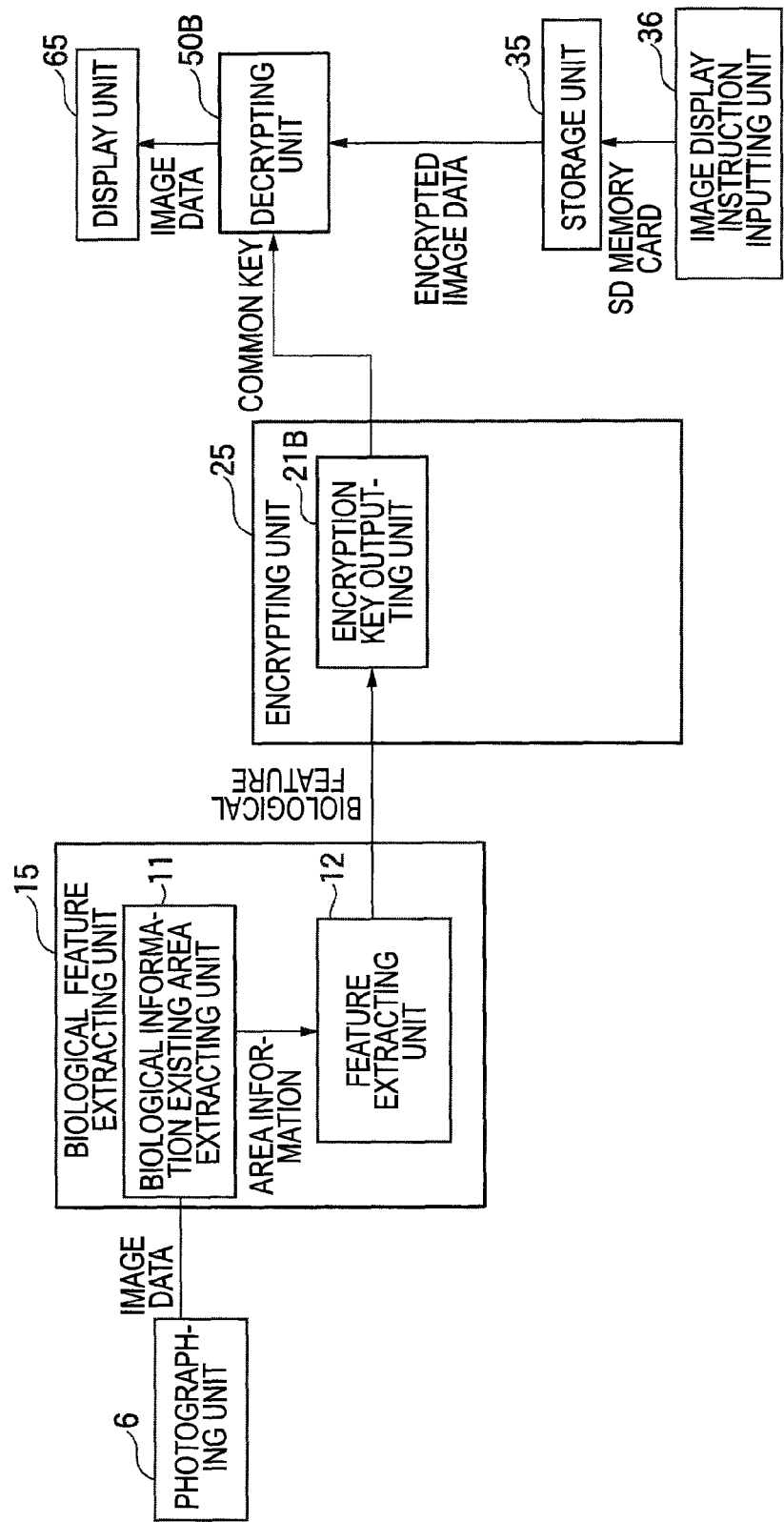
FIG. 12 is a block diagram for showing a structural example of a terminal for displaying thereon image data encrypted by the media data processing apparatus indicated in FIG. 10.
Figure 13:
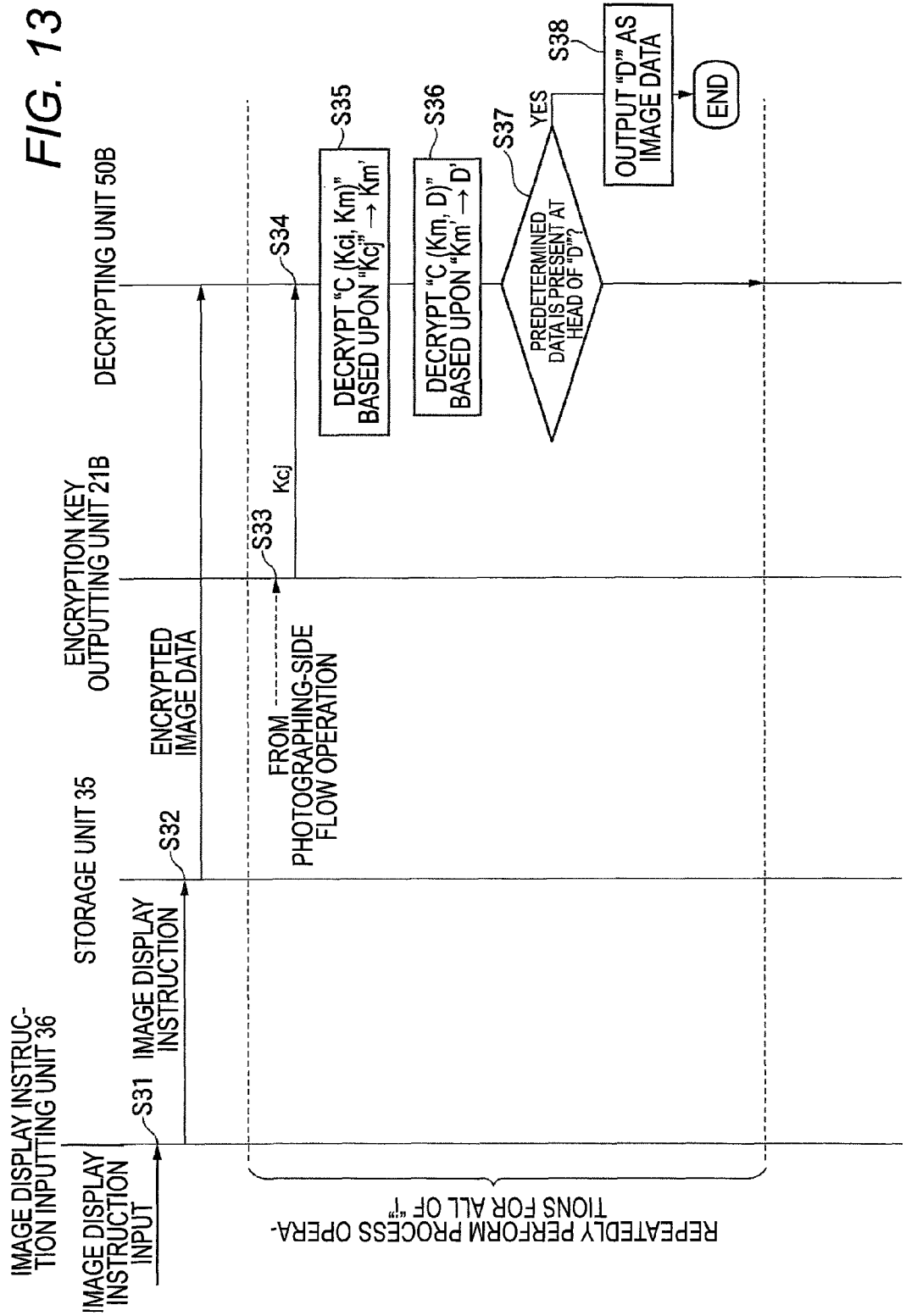
FIG. 13 is a flow chart for indicating major operations of the terminal shown in FIG. 12.
Figure 14:
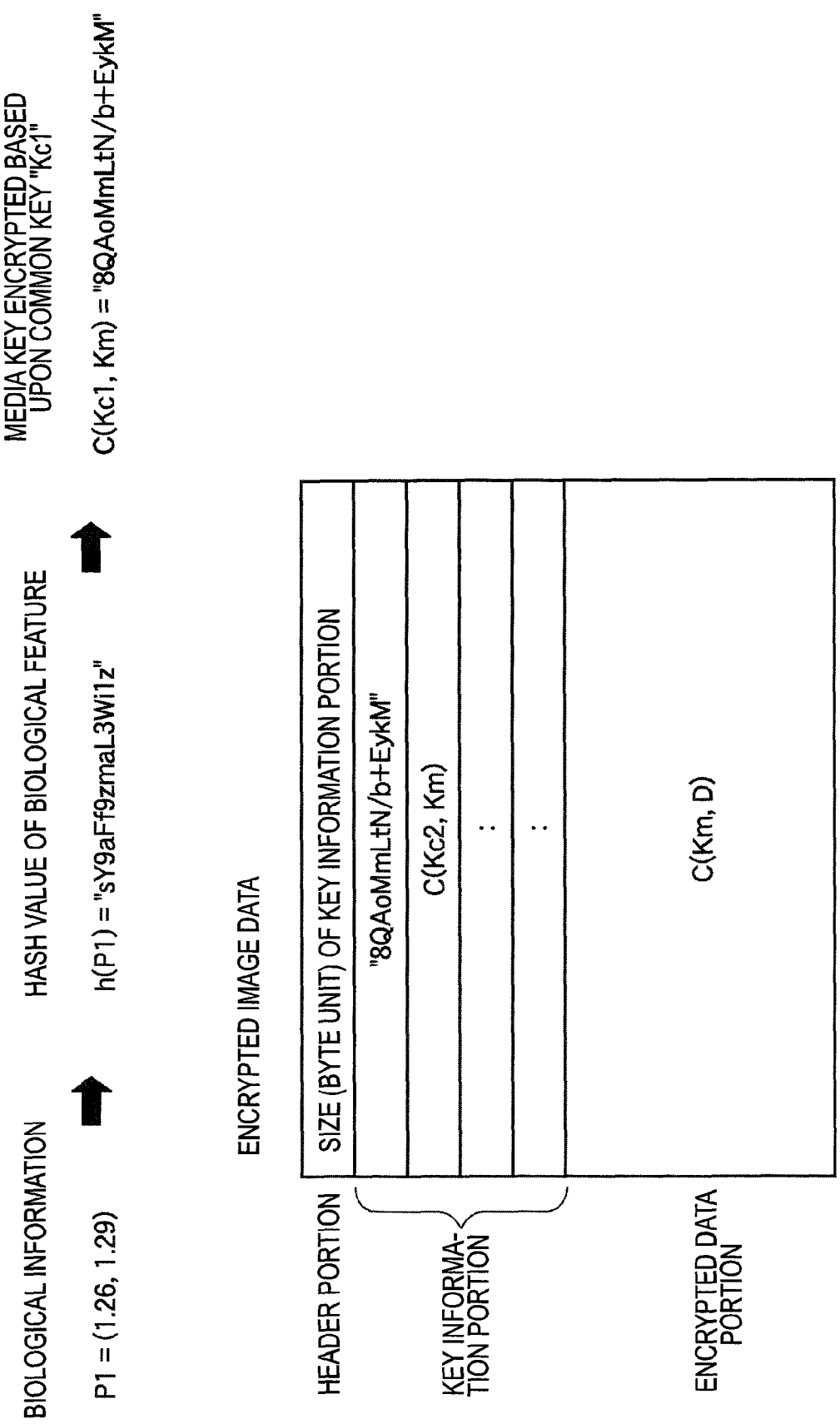
FIG. 14 is a schematic diagram for showing a concrete example of data related to the media data processing apparatus shown in FIG. 10.

FIG. 10 is a block diagram for indicating a concrete structural example of a media data processing apparatus according to a second embodiment mode. FIG. 11 is a flow chart for describing major operations of the media data processing apparatus indicated in FIG. 10. FIG. 12 is a block diagram for showing a structural example of a terminal for displaying thereon image data encrypted by the media data processing apparatus indicated in FIG. 10. FIG. 13 is a flow chart for indicating major operations of the terminal shown in FIG. 12. FIG. 14 is a schematic diagram for showing a concrete example of data related to the media data processing apparatus shown in FIG. 10.

This mode is a modification of the first embodiment. Also it should be noted that in FIG. 10 to FIG. 14 the same reference numerals and symbols shown in the first embodiment will be employed as those for denoting the structural elements corresponding to those of the second embodiment. In the below-mentioned description structural elements and operations that are different from those of the first embodiment will be mainly described.

Similar to the first embodiment, the media data processing apparatus is assumed as such a case that the present invention is applied to a terminal such as a portable telephone equipped with a camera. However this media data processing apparatus does not require a data transmission function such as an electronic mail.

The media data processing apparatus shown in FIG. 10 has been equipped with a photographing unit 5, a biological feature extracting unit 10, an encrypting unit 20B, and a storage unit 35. As the storage unit 35, a storage medium that can be detachably mounted and also can be carried has been assumed, for example, an SD memory card. Also, structures and operations of the photographing unit 5 and the biological feature extracting unit 10 are similar to those of the first embodiment.

The encrypting unit 20B has been equipped with an encryption key outputting unit 21B and an encrypting process unit 22B. The encryption key outputting unit 21B produces a common key based upon biological feature inputted from the feature extracting unit 12, whereas the encrypting process unit 22B encrypts image data outputted from the photographing unit 5, and performs encryption by utilizing the common key produced by the encryption key outputting unit 21B. A content of concrete processing operations is indicated in FIG. 11.

In FIG. 11, respective steps S11, S12, S15, S16 are similar to those of the first embodiment.

In a step S13B, the encryption key outputting unit 21B applies a one-way function (unidirectional function) to biological feature "Pi" entered from the feature extracting unit 12 so as to acquire a hash value "h (Pi)" of the biological feature "Pi." Then, the encryption key outputting unit 21B outputs the hash value "h (Pi)" as a common key "Kci" (refer to FIG. 14).

In a step S17B, the encrypting process unit 22B encrypts the media key (second common key) "Km" produced in the step S15 by employing the common key "Kdi" entered from the encrypt key output unit 21B. The encrypted media key "Km" is expressed as "(C (Kci, Km))" (refer to FIG. 14).

In a step S18B, since the media key "(C (Kci, Km))" obtained in the step S17B is coupled to the encrypted image data "(C (Km, D))" obtained in the step S16, encrypted image data is produced. This encrypted image data is stored in the storage unit 35.

FIG. 14 shows a concrete example as to encrypted image data that is produced by the process operation of FIG. 11. The encrypted image data represented in FIG. 14 has been constituted by a header portion, a key information portion, and an encrypted data portion. The information indicative of the size of the key information portion is stored in the header portion of the encrypted image data; the encrypted media key "C (Kpi, Km)" as to each of the plural persons is stored in the key information portion; and the encrypted image data "C (Km, D)" is stored in the encrypted data portion.

Since the storage unit 35 is dismounted from the terminal and is carried, the encrypted image data can be received and transferred among a plurality of users, or a plurality of terminals. FIG. 12 represents a structural example of a terminal employed in such a case that the received encrypted image data is viewed. As the terminal indicated in FIG. 12, for instance, it is conceivable that a portable telephone terminal equipped with a camera is utilized.

The terminal shown in FIG. 12 has been equipped with a photographing unit 6, a biological feature extracting unit 15, an encrypting unit 25, a storage unit 35, an image display instruction inputting unit 36, a decrypting unit 50B, and a display unit 65.

The photographing unit 6 is such an imaging apparatus as a camera mounted on a portable telephone terminal equipped with the camera, while the imaging apparatus is capable of photographing an image of a face of a user herself of the terminal.

Similar to the biological feature extracting unit 10 of the media data processing apparatus shown in FIG. 10, the biological feature extracting unit 15 has been provided with a biological information existing area extracting unit 11 and a feature extracting unit 12. The biological feature extracting unit 15 enters thereinto image data containing a face of a user from the photographing unit 6, and then, performs a process operation similar to that of the above-described biological feature extracting unit 10.

The encrypting unit 25 has contained therein an encryption key outputting unit 21B. Operations of the encryption key outputting unit 21B is equivalent to the operations of the above-described encryption key outputting unit 21.

The storage unit 35 is a storage medium such as an SD memory card, which can be dismounted from the terminal and can be carried, while the storage unit 35 has held the encrypted image data produced by the media data processing apparatus shown in FIG. 10.

The image display instruction inputting unit 36 corresponds to such an input device as a key switch which can be manipulated by a user, and is utilized in order to input an instruction issued from the user. The decrypting unit 50B inputs thereinto the encrypted image data which has been held in the storage unit 35, and performs a decrypting process operation with respect to the inputted encrypted image data by utilizing the common key produced by the encrypting unit 25 so as to restore the image data before being encrypted. The display unit 65 displays the image data restored by the decrypting unit 50B on the screen thereof.

A content of major process operations of the terminal indicated in FIG. 12 is represented in FIG. 13. A description is made of the process operations shown in FIG. 13 as follows:

That is, in a step S31, when the user operates the image display instruction input unit 36, the image display instruction input unit 36 supplies an image display instruction to the storage unit 35. In a step S32, when the image display instruction is inputted, the storage unit 35 outputs encrypted image data to the decrypting unit 50, which has been held in the own storage unit 35.

On the other hand, in response to the image display instruction outputted from the image display inputting unit 36, the photographing unit 6 photographs the latest image (face of user is contained as imaging subject), and then, the biological feature extracting unit 15 produces biological feature based upon the latest image. Then, the encryption key outputting unit 21B provided in the encrypting unit 25 produces a common key "Kcj" based upon biological feature "Pj" outputted from the biological feature extracting unit 15.

In other words, similar to the step S13B shown in FIG. 11, the encryption key outputting unit 21B applies the one-way function to the biological feature "Pj" so as to acquire a hash value "h (Pj)" of the biological feature "Pj." Then, the encryption key outputting unit 21B outputs the hash value "h (Pj)" as a common key "Kcj." That is to say, the encryption key outputting unit 21B produces the common key "Kcj" based upon a feature parameter of the face of the user who tries to view the encrypted image which has been stored in the storage unit 35.

When the common key "Kcj" is entered from the encryption key output unit 21B in a step S34, the process operation of the decrypting unit 50B is advanced to a process operation of a step S35. In the step S35, the encrypting unit 50B derives encrypted media key "(C (Kci, Km))" from the encrypted image data, and performs a decrypting process operation with respect to the derived encrypted media key "(C (Kci, Km))" by employing the common key "Kcj." As a consequence, a media key "Km'" is obtained.

That is to say, in such a manner that a both a person who has been photographically taken in an image to be viewed and a user who tries to view this image are identical to each other, a feature parameter of biological information when a common key "Kci" is produced is essentially identical to a feature parameter of biological information when a common key "Kcj" is produced, so that the common key "Kci" and the common key "Kcj" become the same values. As a consequence, the media key "Km'" obtained by decrypting the encrypted media key "(C (Kci, Km))" by employing the common key "Kcj" has the same value as the media key "Km" obtained by decrypting the encrypted media key "(C (Kci, Km))" by employing the common key "Kci."

It should also be noted that if an error is contained in a feature parameter of biological information extracted by the feature extracting unit 12, then both a common key "Kci" and a common key "Kcj" which are produced from the biological information of the same person do not become the same value. As a result, in the process operation of the encryption key outputting unit 21B in the step S13B, the below-mentioned key producing method is desirable. That is, after the error contained in the feature parameter has been eliminated by rounding the given feature parameters within effective digit number, the one-way function is applied to the resulting feature parameter so as to produce the common key "Kci" and the common key "Kcj."

In the next step S36, the decrypting unit 50B derives encryption image data "(C (Km, D))" from the encrypted image data, and performs a decrypting process operation by employing the media key "Km'" obtained in the step S35 so as to produce image data "D'" before being encrypted. This image data "D'" is equivalent to the photographed image data "D".

In the exemplification shown in FIG. 13, in order to check whether or not the image data "D'" restored in the step S36 has been decrypted in a correct manner, the decrypting unit 50B confirms whether or not predetermined data (character string specific to file format) is present in a head area of a file of image data "D'") when the decrypting unit 50B confirms that the predetermined data is present in the head area, the process operation of the decrypting unit 50B is advanced to a next step S38; in this step S38, the decrypting unit 50B displays the image data "D'" as an image. It should also be noted that the above-described process operation of the step S37 may be alternatively omitted.

As a consequence, such a condition that the image data can be viewed is limited only to such a case that the user photographed by the photographing unit 6 of the viewing-purpose terminal is coincident with the person who has been photographically taken in the image data to be viewed. Also, when the image data is encrypted, the encryption is carried out based upon the feature of the biological information of the persons which have been photographically taken in the image data. As a result, the special information such as IDs and passwords need not be managed in the terminal for encrypting the image and the terminal for viewing the image, respectively. Also, there is no need that the public key of the user is previously prepared.

Third Embodiment Mode

Referring now to FIG. 15 to FIG. 20, a description is made of another embodiment related to both the media data processing apparatus and the media data processing method according to the present invention.

Figure 15:
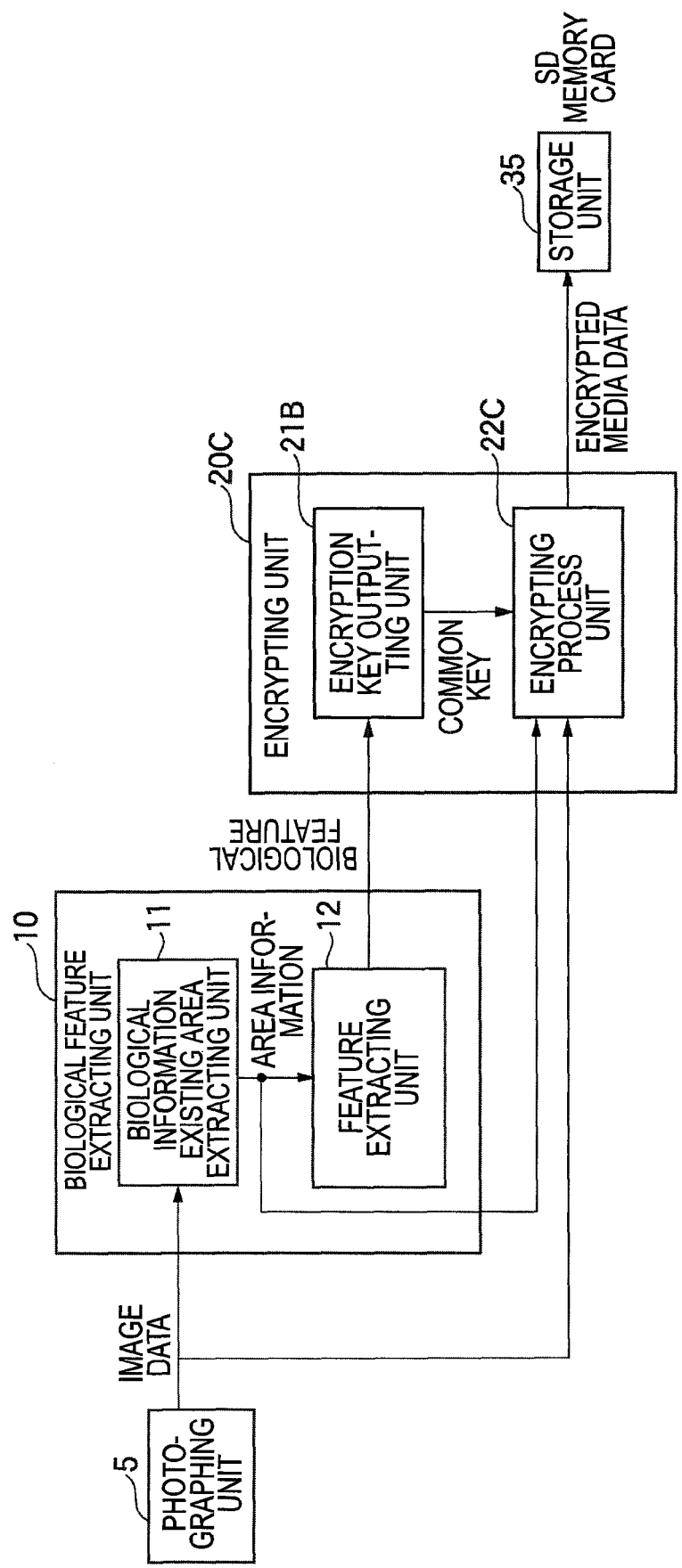
FIG. 15 is a block diagram for indicating a concrete structural example of a media data processing apparatus according to a third embodiment mode.
Figure 16:
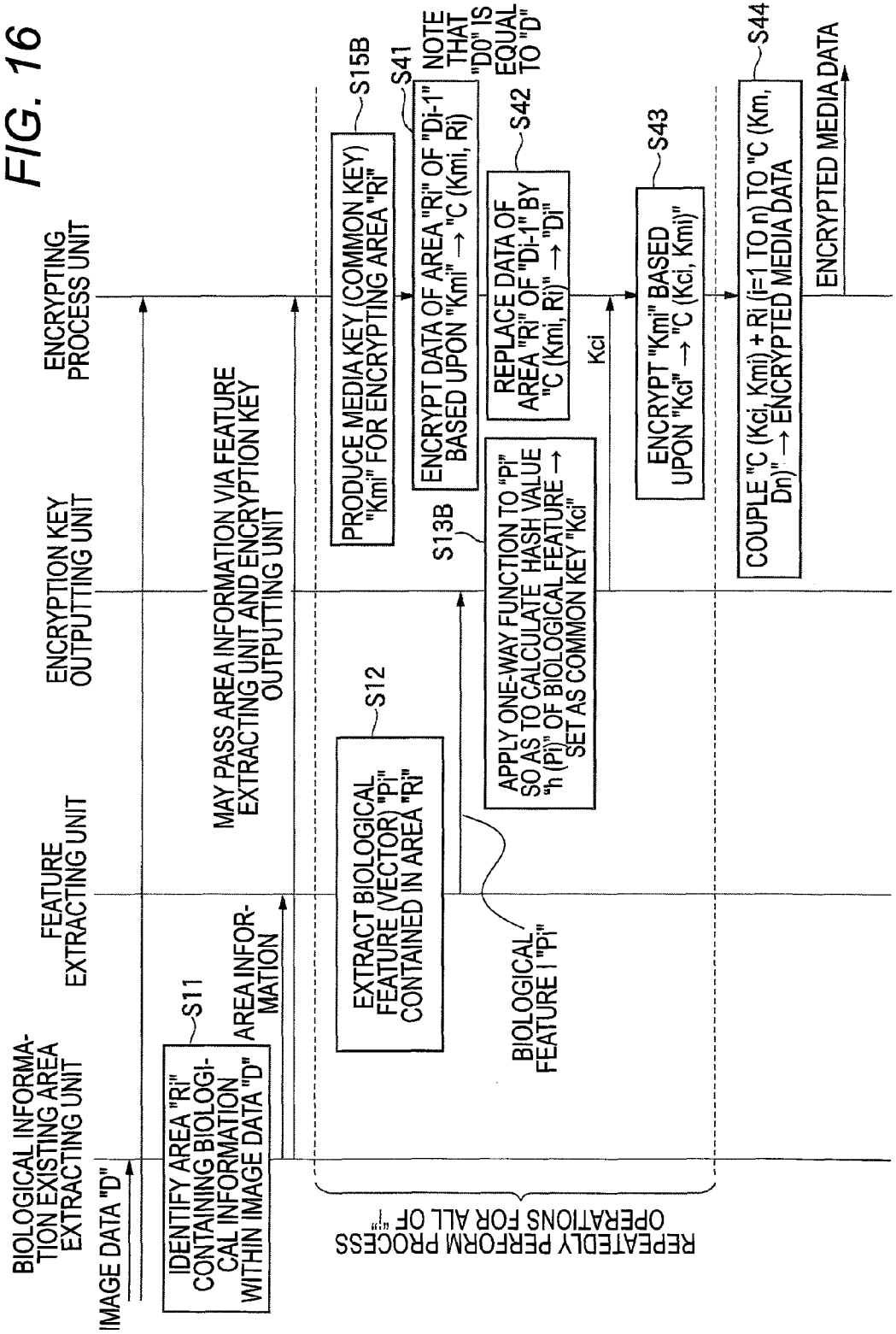
FIG. 16 is a flow chart for describing major operations of the media data processing apparatus indicated in FIG. 15.
Figure 17:
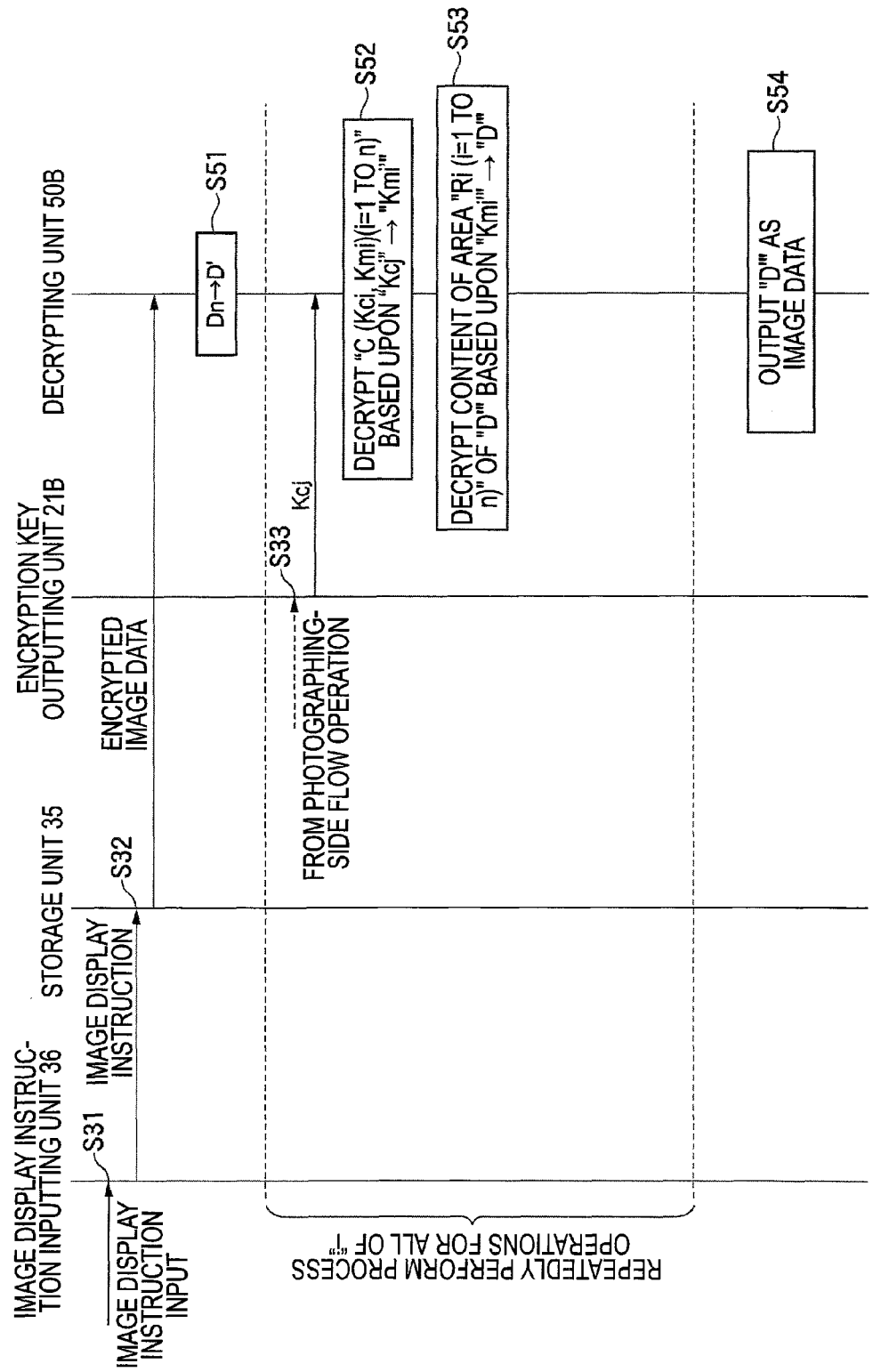
FIG. 17 is a flow chart for describing major operations of a terminal for displaying thereon image data encrypted by the media data processing apparatus indicated in FIG. 15.
Figure 18:
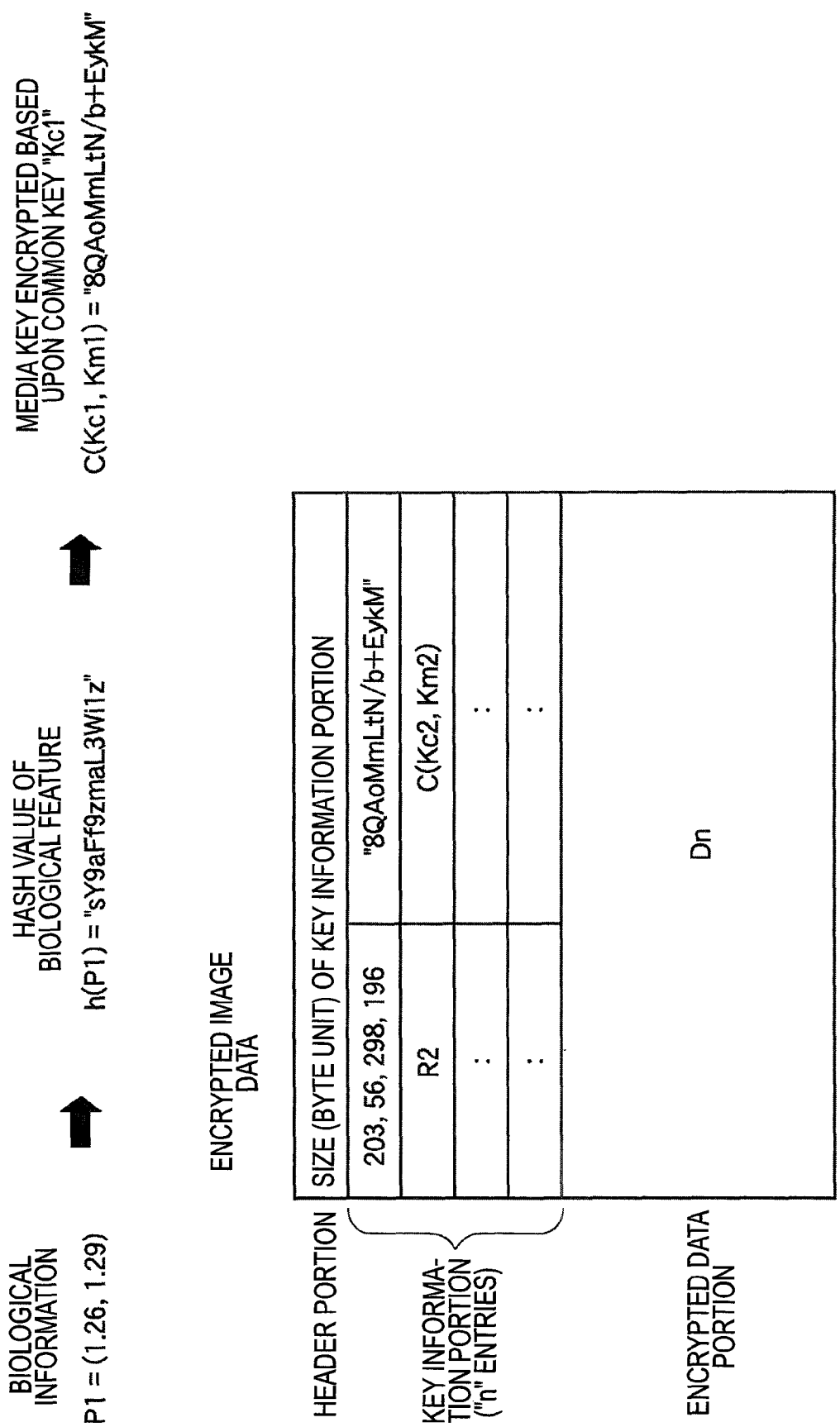
FIG. 18 is a schematic diagram for showing a concrete example of data related to the media data processing apparatus shown in FIG. 15.
Figure 19:
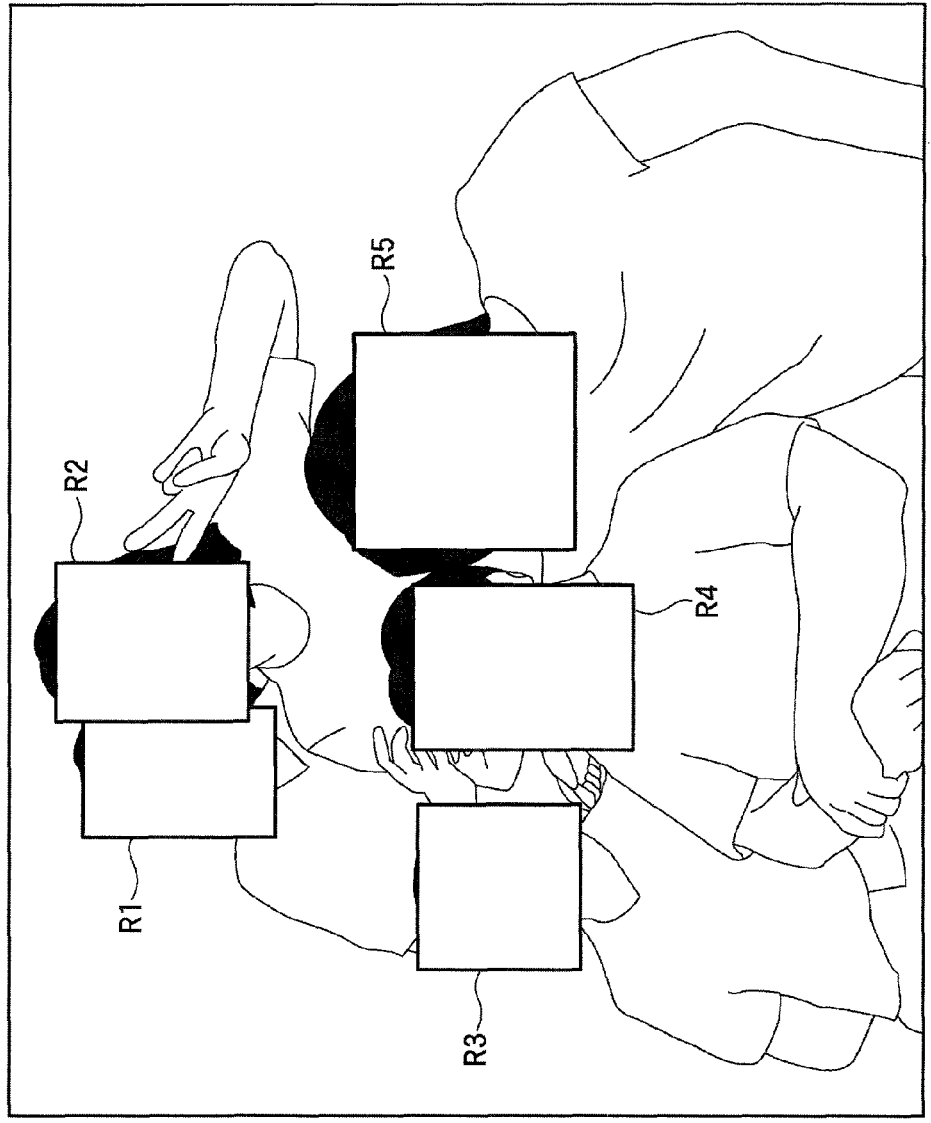
FIG. 19 is a schematic diagram for representing another concrete example of data related to the media data processing apparatus indicated in FIG. 15.
Figure 20:
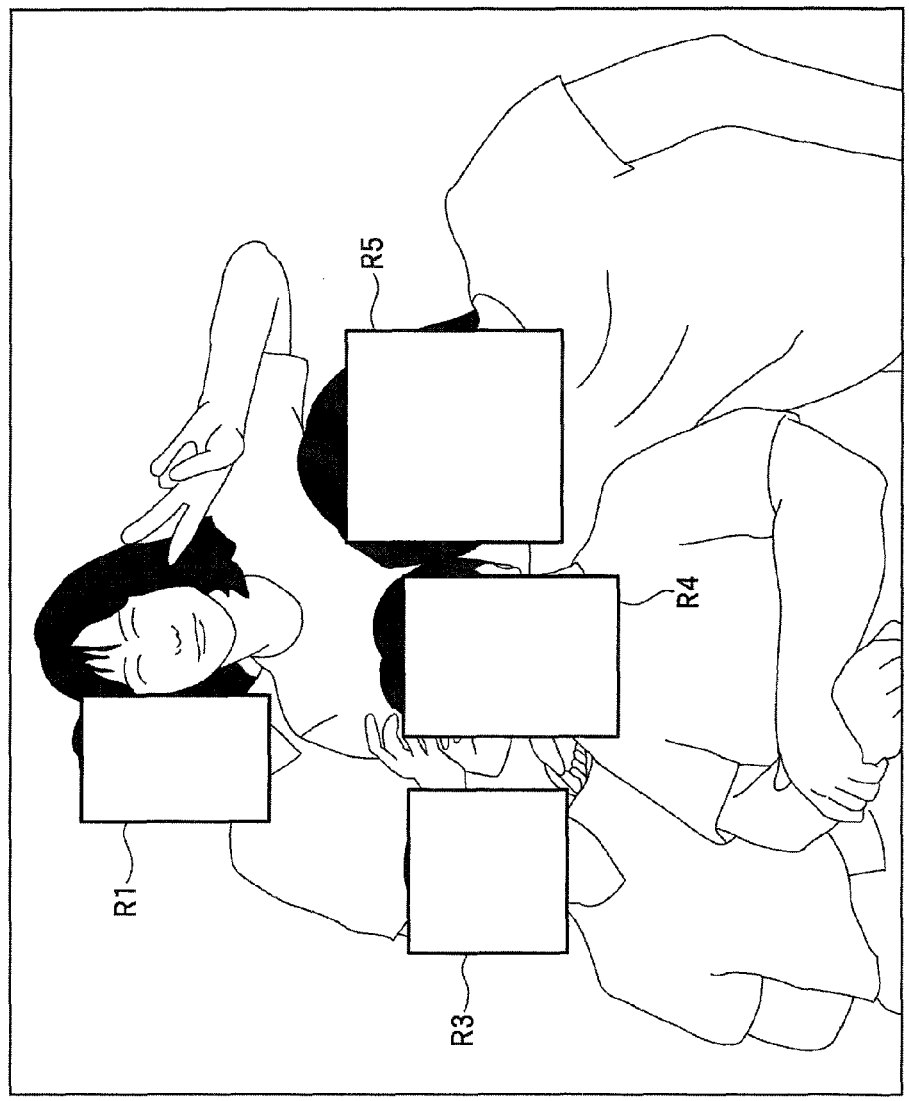
FIG. 20 is a schematic diagram for representing another concrete example of data related to the media data processing apparatus indicated in FIG. 15.

FIG. 15 is a block diagram for indicating a concrete structural example of a media data processing apparatus according to a third embodiment mode. FIG. 16 is a flow chart for describing major operations of the media data processing apparatus indicated in FIG. 15. FIG. 17 is a flow chart for describing major operations of a terminal for displaying thereon image data encrypted by the media data processing apparatus indicated in FIG. 15. FIG. 18 is a schematic diagram for showing a concrete example of data related to the media data processing apparatus shown in FIG. 15. FIG. 19 is a schematic diagram for representing another concrete example of data related to the media data processing apparatus indicated in FIG. 15. FIG. 20 is a schematic diagram for representing another concrete example of data related to the media data processing apparatus indicated in FIG. 15.

This mode is a modification of the second embodiment. Also, it should be noted that in FIG. 15 to FIG. 20, the same reference numerals and symbols shown in the second embodiment will be employed as those for denoting the structural elements corresponding to those of the third embodiment. In the below-mentioned description structural elements and operations that are different from those of the first embodiment will be mainly described.

Similar to the second embodiment the media data processing apparatus shown in FIG. 15 is assumed as such a case that the present invention is applied to a terminal such as a portable telephone equipped with a camera.

The media data processing apparatus shown in FIG. 10 has been equipped with a photographing unit 5, a biological feature extracting unit 10, an encrypting unit 20C, and a storage unit 35. As the storage unit 35, a storage medium that can be detachably mounted and also can be carried is assumed, for example, an SD memory card. Also, structures and operations of the photographing unit 5 and the biological feature extracting unit 10 are similar to those of the first embodiment.

The encrypting unit 20C has been equipped with an encryption key outputting unit 21B and an encrypting process unit 22C. The encryption Key outputting unit 21B produces a common key based upon biological featured information inputted from the feature extracting unit 12, whereas the encrypting process unit 22C partially encrypts image data outputted from the photographing unit 5, and performs encryption by utilizing the common key produced by the encryption key outputting unit 21B. A content of concrete processing operations is indicated in FIG. 16.

Similar to the second embodiment, the biological information existing area extracting unit 10 detects an area "Ri" which contains biological information within image data to be processed in a step S11. For instance, the biological information existing area extracting unit 10 detects an area "Ri" of a face every person. Also, in a step S12, the feature extracting unit 12 extracts biological featured information "Pi" every area "Ri" detected in the step S11.

In a step S13B, the encryption key outputting unit 21B applies a one-way function to the biological featured information "Pi" inputted from the feature extracting unit 12 so as to obtain a hash value "h (Pi)" inputted from the feature extracting unit 12. Then, the encryption key outputting unit 21B outputs the hash value "h (Pi)" as a common key "Kci" (refer to FIG. 18).

The information (coordinates information indicative of both position and dimension of rectangle) of the area "Ri" which is detected by the biological information existing area extracting unit 11 is also inputted to the encrypting process unit 22C. When the information of the area "Ri" is entered from the biological information existing area extracting unit 11 to the encrypting process unit 22C, the process operation of the encrypting process unit 22C is advanced to a process operation of a step S15B.

In the step S15B, media keys (common keys) "Kmi" for encrypting the detected respective areas "Ri" are produced whose total number is equal to a total number of these areas "Ri."

In a step S41, the encrypting unit 22C performs an encrypting process operation with respect to partial image data which corresponds to an "i"th area "Ri" detected in the step S11 among the image data to be processed by employing an "i"th media key "Kmi" in the step SS15B. A result of the encrypting process operation is defined as "i"th encrypted partial image data "C (Kmi, Ri)." It should also be understood that symbol (Di-1) represents entire image data before being processed.

In a step S42, the encrypting process unit 22C substitutes the partial image data corresponding to the "i"th area "Ri" detected in the step S11 among the image data to be processed by the encrypted partial image data "C (Kmi, Ri)" produced in the step S41, and then, outputs the substitution result as processed image data "Di."

In other words, the encrypting process unit 22C encrypts only the data of the areas "Ri" corresponding to the faces of the respective persons within the image data of 1 frame which should be processed by employing the media keys "Kmi" so as to produce such a processed image data "Di" that only the respective areas "Ri" within the image data of 1 frame before being encrypted have been partially encrypted.

In a next step S43, the encrypting process unit 22C encrypts each of the media keys "Kmi" produced in the step S15B by employing the "i"th common key "Kci" inputted from the encryption key outputting unit 21B so as to produce an encrypted media key "C (Kci, Kmi)."

In such a case that a plurality of persons have been photographically taken in the image data of 1 frame to be processed, the respective steps S12, S13B, S15B, S41, S42, and S43 are repeatedly executed in plural times equal to a total number of these persons.

In a step S44, the encrypting process unit 22C produces encrypted image data by coupling the encrypted media key "C (Kci, Kmi)" produced in the step S43, the information of the area "Ri" detected in the step S11, and the encrypted partial image data "C (Kmi, Ri)" of each of the areas, which was produced in the step S41, with each other. This encrypted image data is stored in the storage unit 35.

FIG. 18 shows a concrete example as to the encrypted image data. The encrypted image data represented in FIG. 18 has been constituted by a header portion, a key information portion, and an encrypted data portion.

The header portion stores thereinto information indicative of the size of the key information portion. While the key information has been provided with a plurality of storage areas which correspond to a total number of persons contained in image data of 1 frame, each of the storage regions stores thereinto both the coordinate information of the "i"th area "Ri" and the encrypted media key "C (Kci, Kmi)" which is defined in correspondence with the area "Ri." The encrypted data portion stores thereinto such a processed image data "Dn" that only the data of the respective areas "Ri" within the image data of 1 frame has been partially encrypted.

If the processed image data "Dn" is directly reproduced, then such an image as shown in, for example, FIG. 19 is displayed. That is to say, although any image portions other than the faces of the respective persons which have been photographically taken in the image can be viewed under normal condition, since the face areas of the respective persons have been encrypted respectively, these face areas cannot be viewed similar to such a case that, for example, mosaics have been applied to these face areas.

Similar to the second embodiment, since the storage unit 35 is dismounted from the terminal and is carried, the encrypted image data can be received and transferred among a plurality of users, or a plurality of terminals. In such a case that the received encrypted image data is viewed, the terminal having the above-described structure shown in FIG. 12 may be employed. It is conceivable that a portable telephone terminal equipped with a camera may be utilized as the concrete terminal. It should also be noted contents of process operations executed by the terminal in order to reproduce the encrypted image data have been changed into contents of process operations as shown in FIG. 17. A description is made of the process operations shown in FIG. 17.

In a step S31, when the user operates the image display instruction inputting unit 36, the image display instruction inputting unit 36 supplies an image display instruction to the storage unit 35. In a step S32, when the image display instruction is inputted, the storage unit 35 outputs encrypted image data to the decrypting unit 50, which has been held in the own storage unit 35.

On the other hand, in response to the image display instruction outputted from the image display inputting unit 36, the photographing unit 6 photographs the latest image (face of user is contained as imaging subject), and then, the biological feature extracting unit 15 produces biological feature based upon the latest image. Then, the encryption key outputting unit 21B provided in the encrypting unit 25 produces a common key "Kcj" based upon biological feature "Pj" outputted from the biological feature extracting unit 15.

In other words, similar to the step S13B shown in FIG. 16, the encryption key outputting unit 21B applies the one-way function to the biological feature "Pj" so as to acquire a hash value "h (Pj)" of the biological feature "Pj." Then, the encryption key output unit 21B outputs the hash value "h (Pj)" as a common key "Kcj." That is to say, the encryption key outputting unit 21B produces the common key "Kcj" based upon a feature parameter of the face of the user who tries to view the encrypted image which has been stored in the storage unit 35.

The decrypting unit 50B extracts data "Dn" of the encrypted data portion as image data "D'", which has been contained in the encrypted image data in a step S51.

Also, when the common key "Kcj" is entered from the encryption key output unit 21B, the process operation of the decrypting unit 50B is advanced to a process operation of a step S52. In the step S52, the encrypting unit 50B derives each of encrypted media key "(C (Kci, Km))" from the encrypted image data, and performs a decrypting process operation with respect to the derived encrypted media key "(C (Kci, Km))" by employing the common key "Kcj." As a consequence, an "i"th media key "Kmi'" is obtained.

In a next step S53, the decrypting unit 50B performs a decrypting process operation by employing the media key "Kmi'" obtained in the step S52 with respect to the "i"th area "Ri" extracted in the step S51 so as to produce image data "D" before being encrypted.

It should also be noted that when there is only one user who tries to view an encrypted image, since only one common key "Kcj" is outputted from the encryption key outputting unit 21B, only one media key "Kmi'" can be correctly decrypted, but other media keys "Kmi" cannot be correctly decrypted in the step S52. As a consequence, the partial image data that is correctly decrypted in a step S53 is only such an image data corresponding to one region.

As a consequence, for example, as shown in FIG. 19, in the case that encrypted image data of such an image where 5 persons have been photographically taken is viewed, when one person photographically taken in this encrypted image data tries to view this image as the user, for instance, as represented in FIG. 20, only a partial image (face region) corresponding to the user herself can be correctly decrypted to be displayed, and the face information as to the remaining 4 persons cannot be decrypted, so that this user cannot view the face information of the remaining 4 persons.

It should also be understood that the third embodiment has assumed such a case where only the image of the person who is made coincident with the person who tries to view the image is decrypted so as to be able to be viewed. Alternatively, in the case that a user who tries to view an image is coincident with any one of plural persons contained in an image to be viewed, images of all of these persons may be decrypted to be viewed.

Also, in the third embodiment, the following case is supposed: That is, a person who tries to view an image is only one user. However, in an actual case, the below-mentioned case may be supposed: That is, a third party peeps into the screen of the terminal from the side direction of the user in combination with the user. Accordingly, it is preferable to control that, for instance, when such a person having a feature parameter of biological information which is not made coincident with any of plural persons contained in a viewing subject image has been detected from an image photographed by the photographing unit 6, even in such a case that a authorized user tries to view the image, decrypting operation, or displaying operation of this image is ceased.

Although the encrypting process unit encrypts the entire area where the biological information is present in the third embodiment, the encrypting process unit may alternatively perform an encrypting process operation with respect only to a portion of the area where the biological information is contained, for instance, may encrypt only an eye portion. The area where the biological information is contained may be specified based upon information of a feature point extracted by the feature extracting unit. For instance, such an area "Ri" represents an area in the vicinity of an eye of a person, while this area "Ri" surrounds respective coordinate values as to featured points (exemplified by "F1" and "F2" in FIG. 7) of a right eyebrow, featured points (exemplified by "F3" and "F4" in FIG. 7) of a right eye, featured points (not exemplified) of a left eyebrow, and featured points of a left eye, which are extracted by the feature extracting unit 12. As a result, the encrypting process unit 22C performs the encrypting process operation with respect to the area "Ri" instead of the area "Ri" in the step S41 to the step S44 of FIG. 16, so that encrypted media data in which only the eye portion of the person has been encrypted may be obtained.

Also, the above-described respective embodiments have assumed such a case that the feature parameters of the biological information are extracted from the image to be processed. Alternatively, for example, in the case that voice data in addition to the image has been contained as media data, voiceprints of respective persons may be checked from the voice data so as to extract the feature parameters of the biological information.

INDUSTRIAL APPLICABILITY

As previously described, in such a case that the media data containing the image data acquired by photographing the person is received and/or transferred by utilizing, for instance, a storage media such as a memory card, an electronic mail, a server on a network and the like, since the present invention is applied, it is possible to avoid that the image of the person corresponding to the personal information is viewed by the third party. Moreover, the encrypting process operation is carried out based upon the feature parameter of the biological information, so that the ID information and the passwords are no longer used in order to manage the users. As a consequence, on the side for providing the encrypted information, the users can be managed in a low cost, whereas the users who try to view the encrypted information no longer memorize the ID information and the passwords. Accordingly, the superior operability can be achieved, and if there is such an image into which the user herself has been photographically taken, then the user can firmly view the image.

The invention claimed is:

1. A media data processing apparatus for producing encrypted media data from media data containing at least one image information, comprising:
    a biological feature extracting unit for extracting a feature of biological information which is related to at least one person contained in said image information from said media data inputted thereinto;
    an encrypting process unit for partially, or wholly encrypting said media data based upon the feature extracted by said biological feature extracting unit; and
    a personal information acquiring unit for acquiring information of a public key from the feature extracted by said biological feature extracting unit, said public key being previously allocated to a specific person corresponding to said feature, wherein said encrypting process unit encrypts said media data by employing information of a common key which has been previously prepared, or has been formed so as to produce first encrypted data, encrypts the information of said common key by employing the information of the public key acquired by said personal information acquiring unit so as to produce second encrypted data, and outputs encrypted data which contains both said first encrypted data and said second encrypted data.

2. The media data processing apparatus as claimed in claim 1,
wherein said personal information acquiring unit acquires mail address information which has been previously allocated to a specific person corresponding to the acquired pubic key; and
said encrypting process unit transmits the produced encrypted data via an electronic mail, while the mail address information acquired by said personal information acquiring unit is employed as a destination.

3. A media data processing apparatus for producing encrypted media data from media data containing at least one image information, comprising:
a biological feature extracting unit for extracting a feature of biological information which is related to at least one person contained in said image information from said media data inputted thereinto;
an encrypting process unit for partially, or wholly encrypting said media data based upon the feature extracted by said biological feature extracting unit,
wherein said encrypting process unit encrypts said media data by employing information of a first common key which has been previously prepared, or has been formed so as to produce first encrypted data, produces a hash value as a second common key, which is calculated while the feature extracted by said biological feature extracting unit is employed as a parameter, encrypts the information of said first common key by employing the information of said second common key so as to produce second encrypted data, and outputs encrypted data which contains both said first encrypted data and said second encrypted data.

4. The media data processing apparatus as claimed in claim 1 wherein said biological feature extracting unit extracts said feature from information of an area equivalent to a face of a person contained in the image of said media data.

5. The media data processing apparatus as claimed in claim 4 wherein in the case that a plurality of persons have been contained in one image of said media data, said biological feature extracting unit extracts features which are independently provided with respect to each of said plural persons.

6. The media data processing apparatus as claimed in claim 4 wherein said encrypting process unit performs an encrypting process operation only to an area within the image of said media data, while said area contains at least a portion of the persons whose features have been extracted, in order that said area within the image is replaced by the encrypted data.

7. The media data processing apparatus as claimed in claim 6, further comprising:
a decrypting process unit for decrypting said encrypted media data; and wherein: said decrypting process unit produces said common key from a feature contained in the latest image acquired by being photographed, and restores the encrypted area data contained in said media data by utilizing said common key.

8. The media data processing apparatus as claimed in claim 7 wherein in the case that a plurality of persons have been contained in the image of said media data, the decrypting process unit restores the image data as to only one area corresponding to the feature extracted from the latest image within the image into which a plurality of areas encrypted for every person have been contained.

9. The media data processing apparatus as claimed in claim 7 wherein in the case that a plurality of persons have been contained in the latest image acquired by being photographed, the decrypting process unit ceases restoring of the image data also as to the restorable area.

10. A media data processing method for producing encrypted media data from media data containing at least one image information, wherein:
a feature of biological information is extracted by one or more configured processing devices from said media data to be inputted, said biological information being related to at least one person contained in the image information of said media data;
said media data is partially, or wholly encrypted by the one or more configured processing devices based upon said extracted feature; and
information of a public key from the extracted feature is acquired by the one or more configured processing devices, said public key being previously allocated to a specific person corresponding to said feature, wherein said media data is encrypted by employing information of a common key which has been previously prepared, or has been formed so as to produce first encrypted data, the information of said common key is encrypted by employing the acquired information of the public key so as to produce second encrypted data, and encrypted data is outputted which contains both said first encrypted data and said second encrypted data.

11. The media data processing method as claimed in claim 10, wherein
mail address information is acquired which has been previously allocated to a specific person corresponding to the acquired pubic key; and
the produced encrypted data is transmitted via an electronic mail, while the acquired mail address information is employed as a destination.

* * * * *